US012606676B2

(12) United States Patent
Maniero et al.

(10) Patent No.: US 12,606,676 B2
(45) Date of Patent: Apr. 21, 2026

(54) COMPOUND, USE THEREOF AND PREPARATION METHOD

(71) Applicant: MAFLON SWISS SA, Lugano (CH)

(72) Inventors: Francesco Maniero, Milan (IT); Matteo Oliva, Milan (IT); Carlo Pretti, Milan (IT); Elisa Martinelli, Milan (IT); Giancarlo Galli, Milan (IT)

(73) Assignee: MAFLON SWISS SA, Lugano (CH)

( * ) Notice: Subject to any disclaimer, the term of this patent is extended or adjusted under 35 U.S.C. 154(b) by 562 days.

(21) Appl. No.: 18/024,746

(22) PCT Filed: Nov. 10, 2021

(86) PCT No.: PCT/IB2021/060391

§ 371 (c)(1),
(2) Date: Mar. 3, 2023

(87) PCT Pub. No.: WO2022/101792

PCT Pub. Date: May 19, 2022

(65) Prior Publication Data

US 2023/0365816 A1 Nov. 16, 2023

(30) Foreign Application Priority Data

Nov. 10, 2020 (IT) ........................ 102020000026879

(51) Int. Cl.

| | |
|---|---|
| ***C08G 77/46*** | (2006.01) |
| ***C08G 77/458*** | (2006.01) |
| ***C09D 5/16*** | (2006.01) |
| ***C09D 183/10*** | (2006.01) |
| *B63B 59/04* | (2006.01) |

(52) U.S. Cl.

CPC ........... *C08G 77/46* (2013.01); *C08G 77/458* (2013.01); *C09D 5/1637* (2013.01); *C09D 5/1675* (2013.01); *C09D 183/10* (2013.01); *B63B 59/04* (2013.01)

(58) Field of Classification Search

CPC ..... C08G 77/46; C09D 5/1637; C09D 5/1675

See application file for complete search history.

(56) References Cited

U.S. PATENT DOCUMENTS

| | | | | |
|---|---|---|---|---|
| 5,124,467 | A * | 6/1992 | Rodgers | C07F 7/0838 556/427 |
| 2007/0053867 | A1* | 3/2007 | Ober | C08L 53/02 424/78.09 |
| 2007/0299143 | A1* | 12/2007 | Koczo | C10L 1/285 516/144 |
| 2010/0036062 | A1* | 2/2010 | Okawa | C08G 77/46 525/474 |
| 2017/0130096 | A1* | 5/2017 | Grunlan | A61L 27/18 |
| 2019/0119505 | A1* | 4/2019 | Webster | C09D 183/08 |

FOREIGN PATENT DOCUMENTS

| | | | |
|---|---|---|---|
| EP | 3489310 | A1 | 5/2019 |
| JP | 2012-501377 | A * | 1/2012 |
| WO | WO 2010/051150 | A1 | 5/2010 |
| WO | WO 2013/052181 | A2 | 4/2013 |
| WO | WO 2013/052181 | A3 | 4/2013 |
| WO | WO 2018/039721 | A1 | 3/2018 |

* cited by examiner

*Primary Examiner* — Marc S Zimmer

(74) *Attorney, Agent, or Firm* — James S. Keddie; Bozicevic, Field & Francis LLP

(57) ABSTRACT

Forming an object of the present invention is a compound of general formula (I) as identified in the present description, a use of the compound of general formula (I) as a biofouling reducing agent, as an antifouling agent and/or fouling release agent, and a composition comprising said compound, a cross-linkable polymer, and preferably hydrophobic silica nanoparticles.

10 Claims, 11 Drawing Sheets

RELEASE (after 90 seconds)
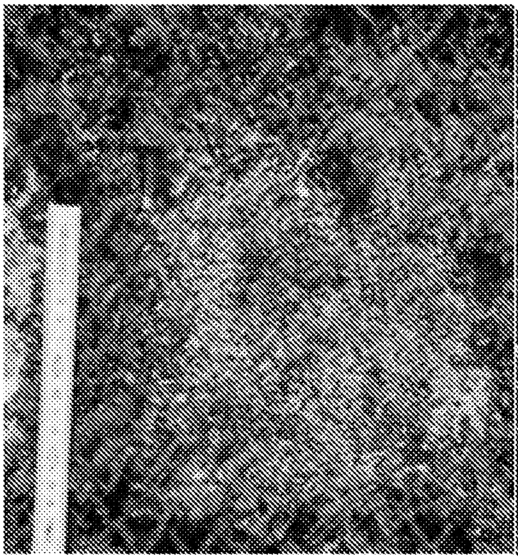
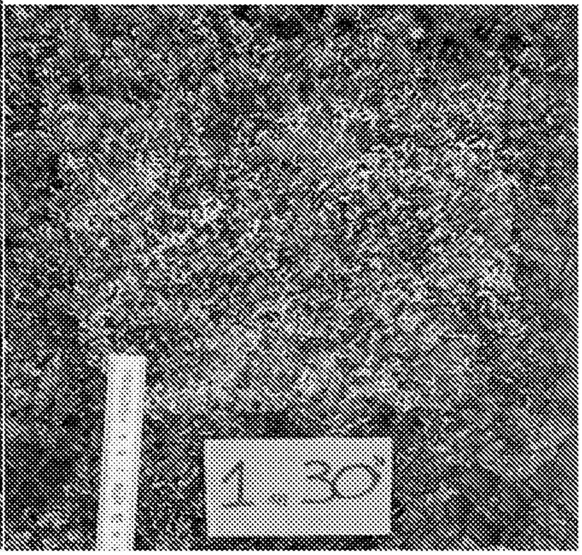
PVC CONTROL
Figure 8A
Figure 8B
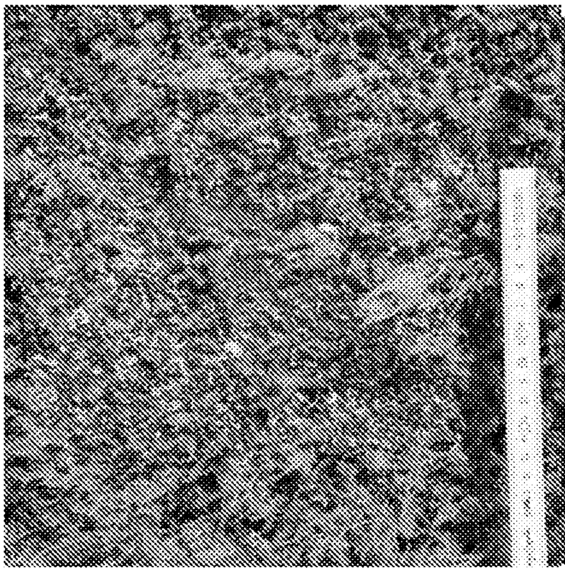
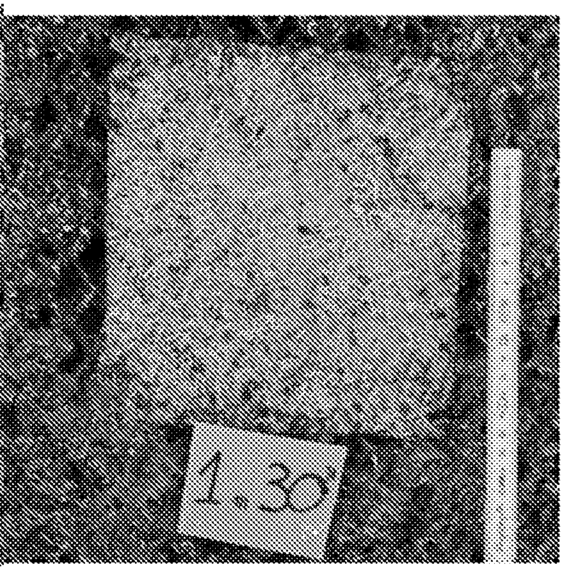
STEEL CONTROL
Figure 9A
Figure 9B

ANF-0A 4% + 0,1% NP PVC

ANF-3A 1% + 0,1% NP PVC

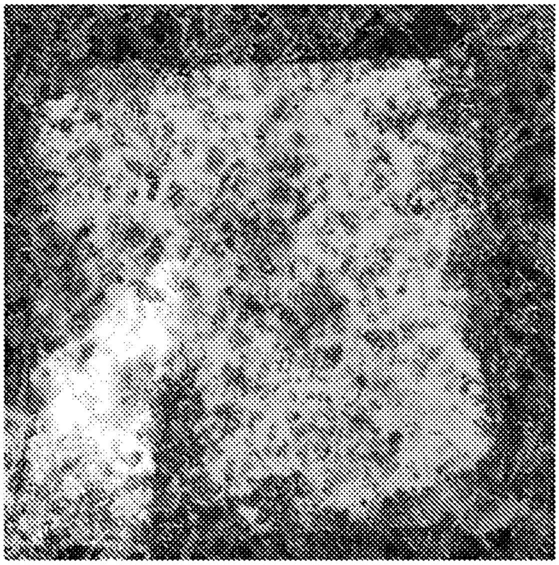
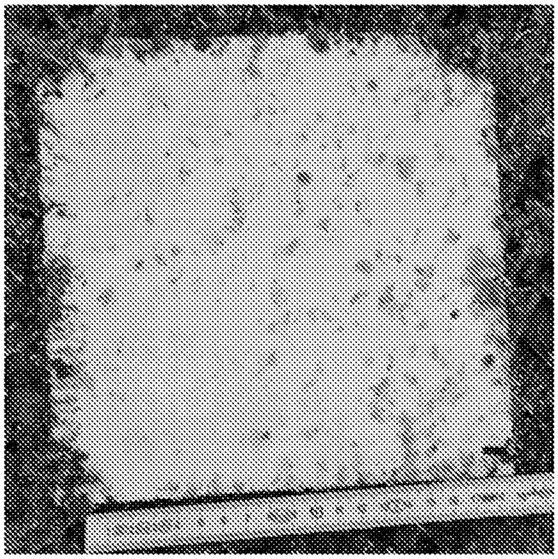
ANF-3A 4% + 0,1% NP PVC
Figure 12A
Figure 12B
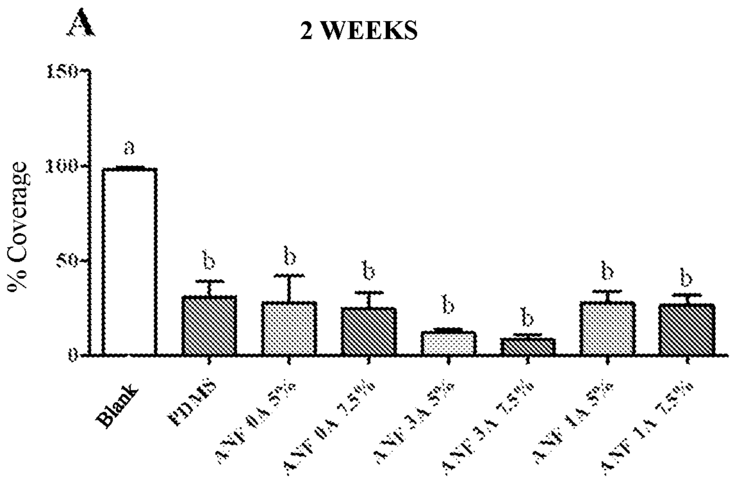
Figure 13

COMPOUND, USE THEREOF AND PREPARATION METHOD

CROSS-REFERENCE TO RELATED APPLICATIONS

This application is a § 371 national phase of International Application No. PCT/IB2021/060391, filed on Nov. 10, 2021, which claims the benefit of Italian Application No. 102020000026879, filed on Nov. 10, 2020, all of which applications are incorporated by reference herein.

FIELD OF THE INVENTION

Forming an object of the present invention is a compound of general formula (I).

Furthermore, forming an object of the present invention is a use of the compound of general formula (I) as a biofouling reducing agent, as an antifouling agent and/or as a fouling release agent.

Furthermore, forming an object of the present invention is a composition comprising said compound of general formula (I), a cross-linkable polymer, and preferably hydrophobic silica nanoparticles.

Furthermore, forming an object of the present invention is a substrate at least partially coated with said composition comprising said compound of general formula (I).

STATE OF THE ART

Any surface, artificial or natural, submerged in sea water is subject to a biofouling process or attack by the flora and fauna present in the water. This phenomenon consists of a progressive accumulation of microorganisms and macroorganisms, plants and animals, which develop and proliferate on the medium offered by the surface, over time.

One of the problems caused by the biofouling attack in the marine environment on the boat hulls is the accumulation of considerable masses of biofouling organisms, where such masses determine an impossibility to carry out visual inspections of the hulls (and therefore to detect possible maintenance needs), poor manoeuvrability of the boats and reduced propulsion efficiency thereof (due to increased frictions), resulting in excessive fuel consumption and increased greenhouse gas emissions.

Currently, most products for coating hulls are based on antifouling coatings containing, and capable of releasing, biocides to protect hulls from marine microorganisms. Given that besides being harmful to the biofouling organisms biocides are also harmful to the marine environment, the use of antifouling coatings is highly criticized and it has already been subjected to many limitations.

Alternatively to biocides, a recent approach provides for the use of non-toxic antifouling materials based on silicone compounds, which facilitate an easier release of the biofouling organisms (fouling release) that can be already caused by the motion of the boat during navigation, thanks to the shear stresses exerted by the water on the hull. However, these materials have not yet conquered significant market perhaps due to their high production, application and maintenance costs. Furthermore, often these new materials based on silicone compounds show fouling release properties only on boats that sail at speeds higher than certain threshold values (for example equal to or higher than 14 knots), values that not all boats are able to achieve.

EP 3 489 310 A1 discloses an antifouling coating composition comprising: (i) 30-95% by weight of polysiloxane-based binder and/or a siloxane copolymer; (ii) 0.1-30% by weight of a copolymer comprising repeating units of formulae (A) and (B1) and/or (B2); and (iii) 0-30% by weight of antifouling agent.

WO 2018/039721 A1 discloses modifiable polymeric coatings to control biointerfacial interactions including the formation of biofilms and the adsorption of proteins on such coatings. Said polymeric coatings comprise a first component comprising epoxy or alkenyl groups, a second component comprising at least one amino group, and at least one bioactive agent.

WO 2010/051150 A1 discloses a polymeric membrane composition with a better water flow and a stable pore size, wherein said membrane comprises a matrix polymer mixed with controlled architecture amphiphilic block copolymers.

WO 2013/052181 A2 discloses silicone polymers having grafted pendant hydrophilic side chains of polyalkylene oxide and, optionally, reactive functional end groups.

Therefore, there is felt the need to be able to have novel compounds, which can be defined as "non-toxic antifouling agents", capable both of reducing the adhesion of biofouling organisms (antifouling) and facilitating the removal thereof. Furthermore, there arises the need to be able to have compounds having low production costs, long-lasting mechanical properties, and which are easy to apply. Following a long and intense research and development activity, the Applicant developed a compound of general formula (I) and a composition capable of providing an appropriate response to the existing limits, drawbacks and problems.

SUMMARY OF THE INVENTION

Therefore, forming an object of the present invention is a compound of general formula (I), having the characteristics as defined in the attached claims.

Furthermore, forming an object of the present invention is a use of the compound of general formula (I) as a biofouling reducing agent, as an antifouling agent and/or as a fouling release agent, having characteristics as defined in the attached claims.

Furthermore, forming an object of the present invention is a composition comprising said compound of general formula (I), a cross-linkable polymer, and preferably hydrophobic silica nanoparticles, having characteristics as defined in the attached claims.

Furthermore, forming an object of the present invention is a substrate at least partially coated with said composition comprising said compound of general formula (I).

BRIEF DESCRIPTION OF THE FIGURES

FIGS. 8A, 8B, 9A, 9B, 10A, 10B, 11A, 11B, 12A, 12B: photographs of control samples and samples treated with the compounds subject of the present invention, before and after exposure to a water jet by means of a pressurised lance (Example n°° 11);

DESCRIPTION OF THE INVENTION

Figure 1:
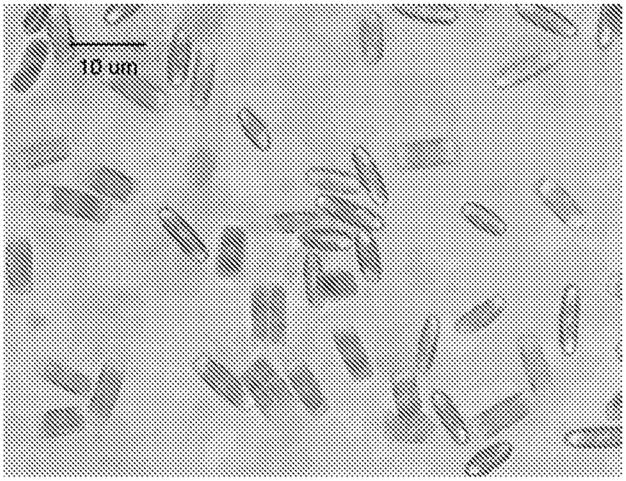
FIG. 1: Example of *Navicula salinicola* diatoms adhered to the polymer, observed through an optical microscope (40×), after 24 hours of incubation.

Forming an object of the present invention is a compound of general formula (I):

(I)

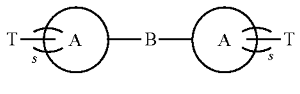

wherein:

B comprises a poly(dialkylsiloxane), preferably poly(diethylsiloxane);

A represents a branched group or a branched polyurethane having s branches, wherein s is an integer comprised from 2 to 7, preferably comprised from 2 to 4; and T represents a polyethylene glycol ether terminated with a fluoroalkyl group, a perfluoroalkyl group or a trialkylsiloxane or polysiloxane group.

Preferably, said poly(dialkylsiloxane) in said B comprises repeating units $-(SiOR'_2)_n-$, wherein n is an integer comprised from 2 to 30, preferably comprised from 3 to 15, and wherein R' is methyl or ethyl, more preferably ethyl.

B more preferably has general formula (B.I), (B.II), (B.III) or (B.IV):

(B.I)

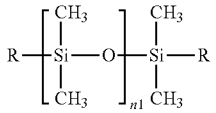

wherein R is selected from:

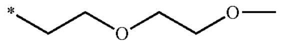

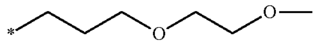

and

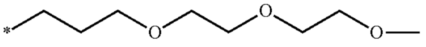

wherein said R is connected to Si at*and wherein n1 is an integer comprised from 2 to 30, preferably comprised from 3 to 15;

(B.II)

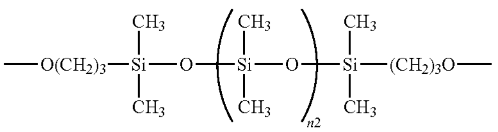

wherein n2 is an integer comprised from 2 to 30, preferably comprised from 3 to 15;

(B.III)

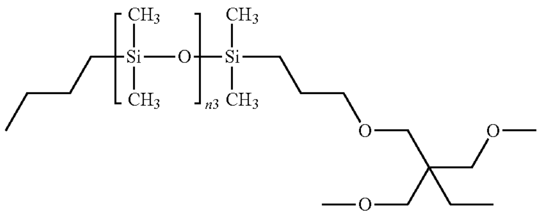

wherein n3 is an integer comprised from 3 to 15;

(B.IV)

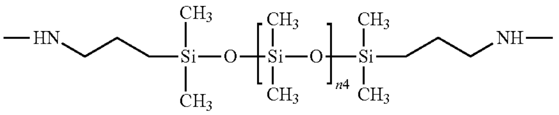

wherein n4 is an integer comprised from 3 to 15.

More preferably, B has general formula (B.I) or (B.I).

In the compound of general formula (I), A—covalently linked with B, preferably with (B.I), (B.II), (B.III) or (B.IV), even more preferably with (B.I) or (B.II)—preferably has general formula (A.I), (A.II), (A.III) or (A.IV):

(A.I)

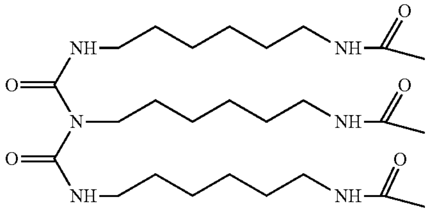

(A.II)

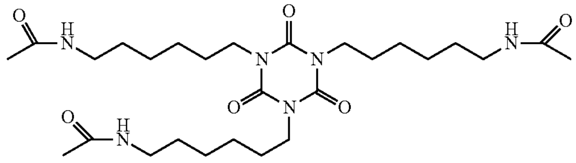

(A.III)

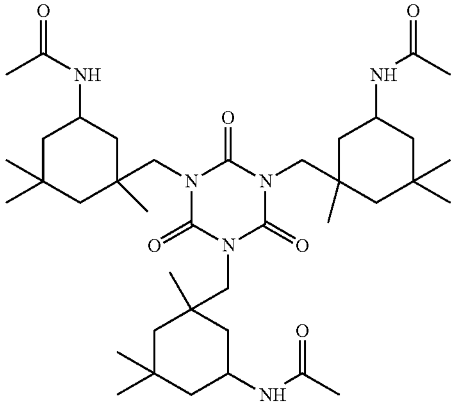

-continued (A.IV)

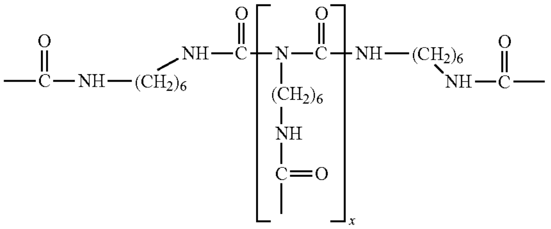

wherein x is an integer comprised from 1 to 6, preferably comprised from 2 to 5.

More preferably, A has general formula (A.I) or (A.II). Even more preferably, the general formula (I) comprises (B.I) or (B.II) linked to (A.I) or (A.II).

Even more preferably B, preferably (B.I), (B.II), (B.III) or (B.IV), even more preferably (B.I) or (B.II), is linked to two A groups, preferably (A.I), (A.II), (A.III) or (A.IV), even more preferably (A.I) or (A.II), which are mutually identical.

Preferably, said compounds of general formula (A.I), (A.II), (A.III) or (A.IV) are obtained from polyisocyanate precursors comprising at least three isocyanate groups. Such polyisocyanate precursors are reported in the following general formulae (A.I'), (A.II'), (A.III') or (A.IV'):

(A.I')

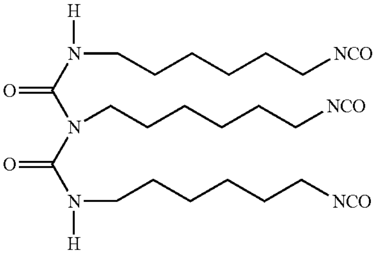

(A.II')

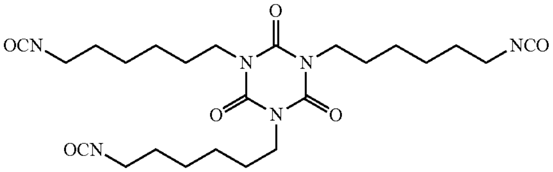

(A.III')

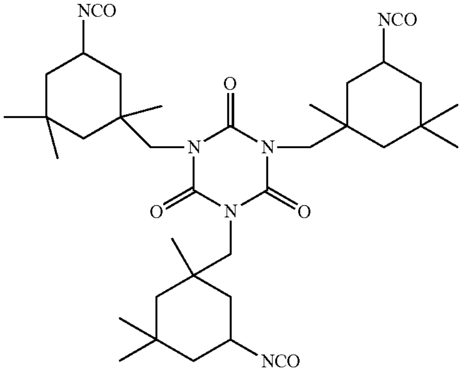

-continued (A.IV')

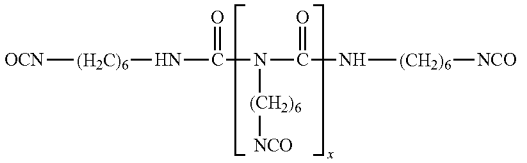

wherein x is defined as above.

Preferably, biuret-based polyisocyanates and isocyanurate ring-based polyisocyanates (for example, isophorone diisocyanate trimers) and other polyisocyanates oligomers can be prepared using monomeric aliphatic diisocyanates. For example, reference shall be made to the prior art document U.S. Pat. No. 3,124,605 A.

By way of example, hexamethylene diisocyanate (HDI) can be used to prepare the HDI-based biuret shown in the general formula (A.I') or in the general formula (A.IV'), or the trimer of general formula (A.II').

By way of further example, isophorone diisocyanate (IPDI) can be used to prepare the trimer of general formula (A.III').

Usually, the trimers with isocyanurate ring obtained from HDI have a lower viscosity with respect to the biurets obtained from the same HDI precursor, whereas the trimers obtained from IPDI have a lower reactivity with respect to the HDI trimer.

Such products are currently available and known under the trade names DESMODUR (for example 3200, N-100, or 3300) by Covestro Deutschland AG, or DURANATE (for example TUL-100, TLA-100, or TKA-100 di Asahi Kasei Corp, or VESTANAT (for example T-1890) by Evonik.

Preferably, T—covalently linked with A, preferably with (A.I), (A.II), (A.III) or (A.IV), more preferably with (A.I) or (A.II)—terminates with a perfluoroalkyl group whose perfluoroalkyl chain has a number of carbon atoms comprised from 1 to 6 and/or with a trialkylsiloxane group ((CH3)3 Si02)2Si- and/or an R”-[Si(CH3)2O]I—Si(CH3)2—group, wherein 1 is an integer comprised from 2 to 30 and R” is a linear or branched alkyl group with a number of carbon atoms comprised from 1 to 20, preferably comprised from 2 to 15.

According to different embodiments, T—covalently linked with A, preferably with (A.I), (A.II), (A.III) or (A.IV), more preferably with (A.I) or (A.II)—is selected from the following, wherein the site of binding with A, (A.I), (A.II), (A.III) or (A.IV) is indicated with bold:

C6F13CH2CH(O—)CH2-O—(CH2CH2O)10-CH3

C4F9CH2CH(O—)CH2-O—(CH2CH2O)10-CH3

C6F13CH2CH(O—)CH2-O—(CH2CH2O)14-CH3

C4F9CH2CH(O—)CH2-O—(CH2CH2O)14-CH3

C6F13CH2CH(O—)CH2-O—(CH2CH2O)12-CH3

C4F9CH2CH(O—)CH2-O—(CH2CH2O)12-CH3

C6F13CH2CH(O—)CH2-O—(CH2CH2O)10-(CH2)3CH3

C4F9CH2CH(O—)CH2-O—(CH2CH2O)10-(CH2)3CH3

C6F13CH2CH(O—)CH2-O—(CH2CH2O)14-(CH2)8CH3

C4F9CH2CH(O—)CH2-O—(CH2CH2O)14-(CH2)8CH3

C6F13CH2CH(O—)CH2-O—(CH2CH2O)12-C6H5

C4F9CH2CH(O—)CH2-O—(CH2CH2O)12-C6H5

C6F13CH2CH(OH)CH2-(N—)—CH(CH3)CH2O—(CH2CH2O)10-CH3

C4F9CH2CH(OH)CH2-(N—)—CH(CH3)CH2O—(CH2CH2O)10-CH3

C6F13CH2CH(OH)CH2-(N—)—CH(CH3)CH2O—(CH2CH2O)14-CH3

C4F9CH2CH(OH)CH2-(N—)—CH(CH3)CH2O—(CH2CH2O)14-CH3

C6F13CH2CH2-O—(CH2CH2O)7-CH2CH2O—

C4F9CH2CH2-O—(CH2CH2O)7-CH2CH2O—

C6F13CH2CH2-O—(CH2CH2O)10-CH2CH2O—

C4F9CH2CH2-O—(CH2CH2O)10-CH2CH2O—

C6F13CH2CH2-O—(CH2CH2O)13-CH2CH2O—

C4F9CH2CH2-O—(CH2CH2O)13-CH2CH2O—

((CH3)3SiO)2Si(CH3)-CH2CH2CH2-O—(CH2CH2O)7-CH2CH2O—

((CH3)3SiO)2Si(CH3)-CH2CH2CH2-O—(CH2CH2O)9-CH2CH2O—

((CH3)3SiO)2Si(CH3)-CH2CH2CH2-O—(CH2CH2O)11-CH2CH2O—

((CH3)3SiO)2Si(CH3)-CH2CH2CH2-O—(CH2CH2O)13-CH2CH2O—

C4H9-[Si(CH3)20]10-Si(CH3)2-CH2CH2CH2-O—(CH2CH2O)7-CH2CH2O

C4H9-[Si(CH3)2O]10-Si(CH3)2-CH2CH2CH2-O—(CH2CH2O)9-CH2CH2O—

(CH3)3Si—O—[Si(CH3)2O]10-Si(CH3)2-CH2CH2CH2-O—(CH2CH2O)11-CH2CH2O—

(CH3)3Si—O—[Si(CH3)20]10-Si(CH3)2-CH2CH2CH2-O—(CH2CH2O)13-CH2CH2O—.

Preferably, in the compound of general formula (I), T—covalently linked with A, preferably with (A.I), (A.II), (A.III) or (A.IV), even more preferably with (A.I) or (A.II)—is selected from: $((CH_3)3SiO)_2Si(CH_3)—(CH_2)3—O—(CH_2CH_2O)_b$-, wherein b is an even number comprised from 3 to 30, preferably from 8 to 14;

or

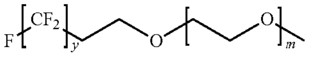

wherein y is an integer comprised from 1 to 6, and wherein m is an integer comprised from 3 to 30, more preferably from 4 to 13.

Even more preferably, the compound of general formula (I) is selected from the following compounds (I.a), (I.b), (I.c), (I.d), or (I.e):

(I.a)
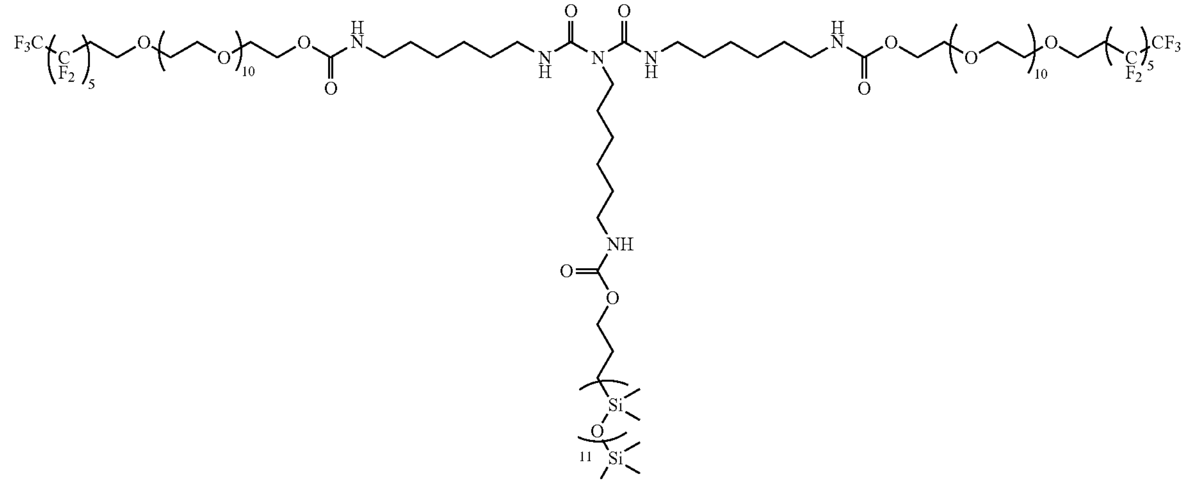
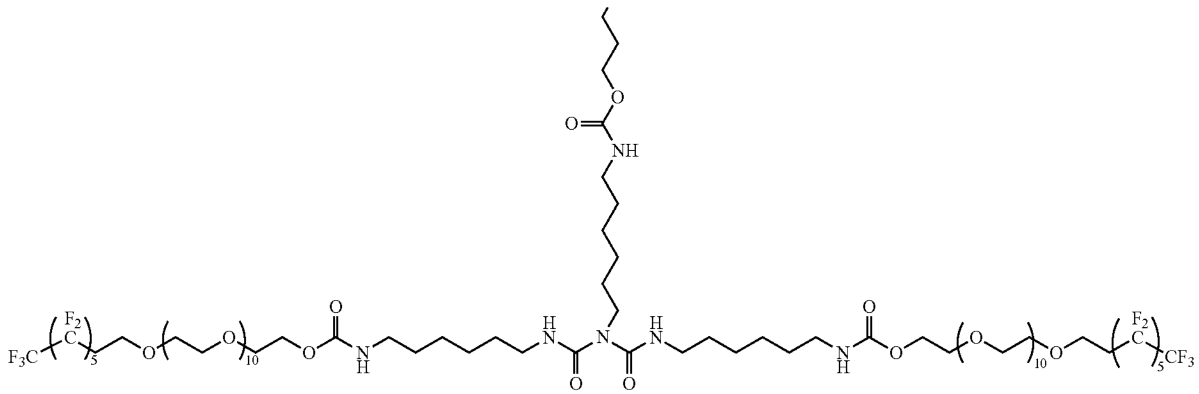
(I.b)
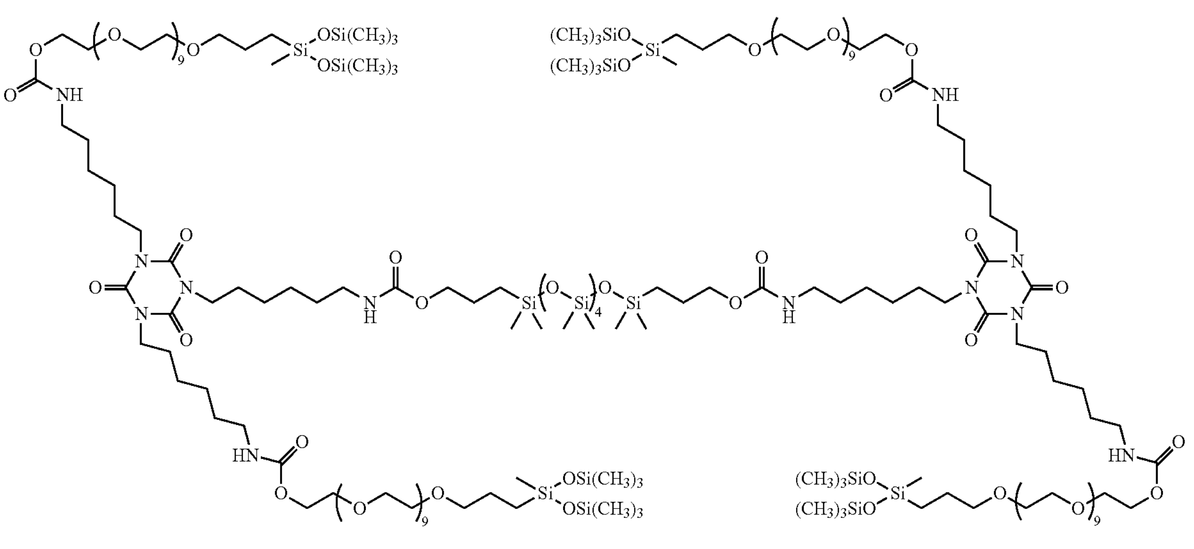

-continued
(I.c)
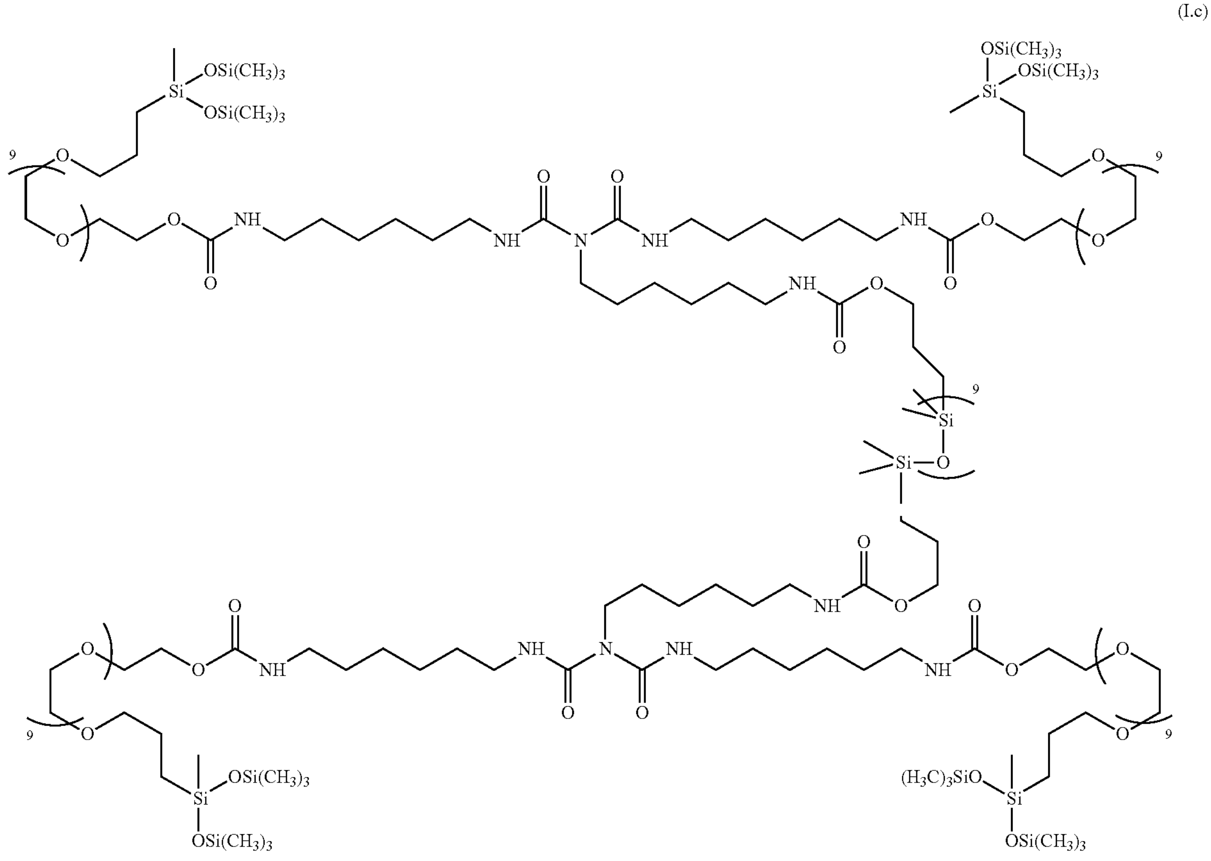
(I.d)
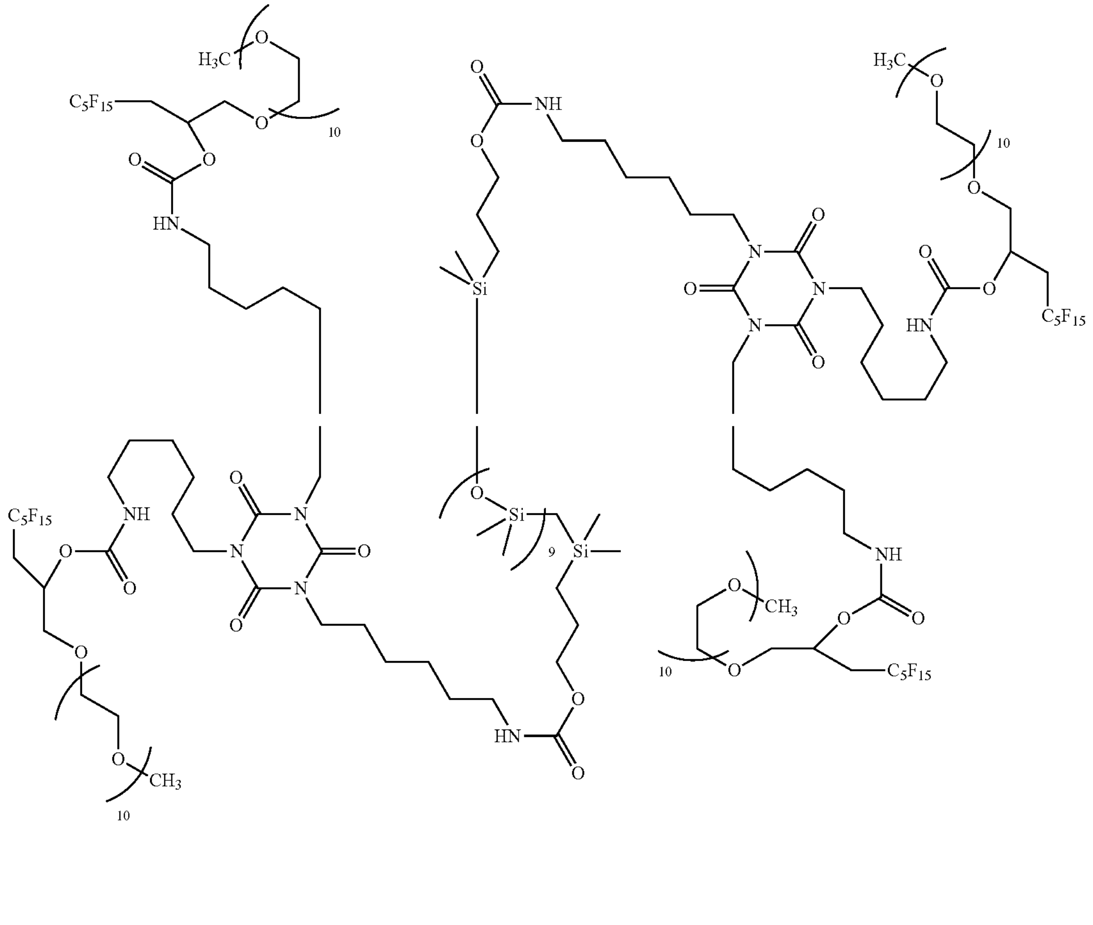

-continued (I.e)

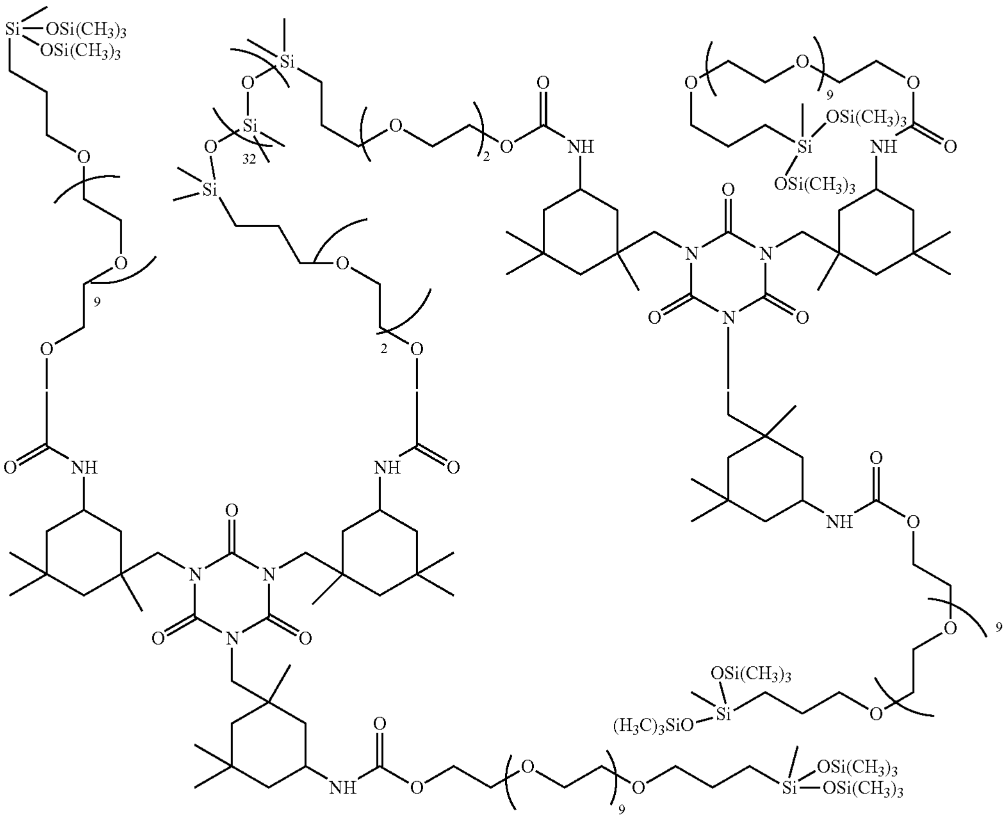

Furthermore, forming an object of the present invention is a use of said compound of general formula (I) as a biofouling reducing agent, as an antifouling agent and/or as a fouling release agent.

Furthermore, forming an object of the present invention is a composition comprising said compound of general formula (I), a cross-linkable polymer and, preferably, one or more technological additives.

Preferably, said composition is a composition for making a coating.

Preferably, said composition is a liquid composition, more preferably a dispersion, a solution or a liquid suspension, even more preferably in aqueous phase or in organic phase.

The cross-linkable polymer is selected from the group comprising or, alternatively, consisting of: acrylic polymer, siloxane-acrylic polymer, polyurethane, acrylic-polyurethane, epoxy and alkyd polymer, silicone polymer, and siloxane polymer.

In an embodiment of the present invention, the cross-linkable polymer of said composition is silicone-based, preferably based on polydimethylsiloxane (PDMS). PDMS has the general formula (II) reported below:

(II)

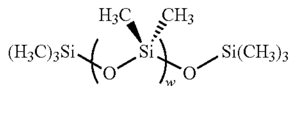

wherein w is an integer comprised from 60 to 680.

In the context of the present description, the expression "based on polydimethylsiloxane" or "based on PDMS" is used to indicate a composition in which PDMS is present in an amount comprised from 20% to 80% by weight, preferably comprised from 35% to 70% by weight, even more preferably comprised from 45% and 60% by weight with respect to the total weight of said composition.

Preferably, PDMS used in said composition is bis-silanol terminated polydimethylsiloxane (in short "HO-PDMS-OH") wherein—with respect to the preceding general formula (II)—at least one methyl group (—$CH_3$) on each terminal silicon is replaced by a hydroxyl group (—OH).

An amount of said compound of general formula (I) in said composition is preferably comprised from 0.05% to 50% by weight with respect to the weight of PDMS or of HO-PDMS-OH in said composition, preferably comprised from 0.1% to 20% by weight, more preferably comprised from 0.5% to 10% by weight, even more preferably comprised from 0.8% to 6.5% by weight, for example 4%, 4.5%, 5%, 5.5%, 6%, 6.5%, 7%, 7.5%, 8%, 8.5%, 9% or 9.5% by weight.

Preferably, in addition to said compound of general formula (I) and to said cross-linkable polymer, said composition comprises silica nanoparticles, preferably hydrophobic silica nanoparticles, said nanoparticles being more preferably functionalized with polydimethylsiloxane chains.

Depending on the type of cross-linkable polymer, the coating composition may further comprise a cross-linking agent and an activating agent (or catalyst).

Examples of catalysts which can be used in said composition are the carboxylic acid salts of various metals, such as tin, zinc, bismuth, barium and zirconium such as for example zinc stearate, and/or bismuth oleate. Further examples of catalysts which can be used in said composition comprise organobismuth and organotitanium and organophosphate compounds such as for example bismuth (2-ethyl hexanoate), bismuth neodecanoate, zinc 2-ethyl hexanoate, zinc neodecanoate, bismuth tetramethyl hexanoate and mixtures thereof and bis(2-ethyl-hexyl) hydrogen phosphate. Other possible catalysts comprise chelates, for example dibutyltin acetylacetonate, zinc acetylacetonate, or halogenated organic acids such as tetrabutylammonium fluoride.

In an embodiment of the present invention, bis-silanol terminated polydimethylsiloxane HO-PDMS-OH is in fact cross-linked at room temperature in the presence of a cross-linking agent (for example poly(diethoxysiloxane) preferably with a percentage of Si comprised from 19% to 23%, more preferably comprised from 20.5% to 21.5%, even more preferably with an average molecular weight of about 134.20 g/mol; preferably poly(diethoxysiloxane) is the compound CAS No. 68412-37-3, also known under the trade name "ES40"), an activating agent (for example tetrabutylammonium fluoride; TBAF) and a solvent (for example xylene or ethyl acetate), according to a hydrolysis reaction and subsequent condensation of the precursors, forming elastomeric films cross-linked within about 24 hours. A TBAF which can be used in the present invention is preferably compound CAS No. 429-41-4. More preferably, the TBAF is in a of tetrahydrofuran (THF) solution, even more preferably in a concentration comprised from 0.5 M to 3.0 M, for example 1.0 M. Active Si-OH silanol groups, which simultaneously give rise to condensation with the Si-OH functionalities of the ES40, of the HO-PDMS-OH terminals and of the surface of the silica nanoparticles already functionalized with PDMS are generated following the hydrolysis—promoted by the humidity of the air—of the SiOEt labile groups of ES40. A process for cross-linking the composition and for further functionalization of the nanoparticles with PDMS is thus carried out at the same time.

By way of example, the amounts of the preceding components, expressed as percentages by weight of the single component with respect to the content by weight of PDMS or HO-PDMS-OH in said composition, are as follows:

- ES40: comprised from 0.5% to 6%, preferably comprised from 1.5% to 4% by weight, even more preferably of about 2.5%;
- TBAF: comprised from 0.01% to 2%, preferably comprised from 0.03% to 1%, even more preferably comprised from 0.08% to 0.3%;
- xylene or ethyl acetate: comprised from 80% a 95%, preferably comprised from 83% to 92%, even more preferably comprised from 86% to 90%.

Preferably, the silica nanoparticles in said composition are in an amount comprised from 0.01% to 10% by weight, preferably comprised from 0.05% to 5% by weight, even more preferably comprised from 0.1% to 1% by weight, with respect to the by weight content of PDMS or HO-PDMS-OH in the composition.

Said silica nanoparticles preferably have an average size distribution comprised from 100 nm to 1000 nm, preferably comprised from 200 nm to 800 nm, even more preferably comprised from 350 nm to 650 nm.

This distribution is measured by means of dynamic light scattering (DLS) measurements carried out with a Beckman Coulter, DelsaNano C particle analyzer instrument, collecting the light intensity scattered at 166.20.

Furthermore, forming an object of the present invention is a substrate at least partially (for example: fully) coated with said composition comprising said compound of general formula (I).

Preferably, said at least partially coated substrate is a substrate submersible/submerged in water, for example a hull of a boat or of a submarine hull, an equipment or a pipe for the transportation of fluids (for example oil or derivatives thereof, or gas), an underwater line for the transportation of electricity or data, a bearing structure of an off-shore platform, or the like.

The present invention is further disclosed based on the following examples, provided solely by way of non-limiting example.

EXAMPLES

Synthesis Example 1 of Compound (I.a)

74.96 g of ethyl acetate, 15.92 g of 1,3,5-tris(6-isocyanatehexyl)biuret (mix of oligomers under the trade name Desmodur 3200 supplied by Covestro Deutschland AG) corresponding to 0.087 NCO equivalents, 49.18 g of a mixture of poly(oxy-1,2-ethanediyl), a-(3,3,4,4,5,5,6,6,7,7,8,8,8-tridecafluorooctyl)-w-hydroxy ($C_6F_{13}CH_2CH_2$—O—$(CH_2CH_2O)_{10}$—$CH_2CH_2OH$) having an average molecular weight of 850 amu corresponding to 0.058 OH group equivalents, are placed in a 250 ml round-bottom flask provided with mechanical stirrer, condenser and nitrogen inlet, heated with an oil bath with temperature control.

The resulting mixture is brought to 75-77° C. for 3 hours controlling the decrease in the intensity of the absorbance peak of the NCO groups at 2261 $cm^{-1}$ through FT-IR analysis.

After 3 hours of reaction, 14.35 g of di-hydroxypropyl terminated polydimethylsiloxane—precursor of the compound of general formula (B.II)—$HO(CH_2)3(SiO(CH_3)2)n_2Si(CH_3)2(CH_2)30H$, having an average equivalent weight of 495 amu, were added, wherein n2 is an integer comprised from 10 to 12.

The reaction is allowed to proceed until the peak completely disappears at 2261 $cm^{-1}$, corresponding to the NCO groups, monitored through FT-IR analysis.

Lastly, the solvent is removed from the reaction mixture through vacuum distillation. About 79 g of a light-yellow viscous compound at 100%, where 100% means 100% of active matter not dissolved in solvent and fully usable, are obtained. The percentage of volatile product is verified by measuring the dry residue through a thermal scale in which a 120° C. temperature isotherm is set. Samples with a range comprised from 98% to 100%, which is compound (la), are accepted. Hereinafter, the compound will be referred to as "ANF-0A" or "ANF OKA, for the sake of brevity.

Synthesis Example 2 of the Group or Product T According to the General Formula (I)

A homogeneous mixture of 91.18 g of a polyoxyalkylene terminated with a vinyl functionality of formula $CH_2$═$CHCH_2O(CH_2CH_2O)_{10}H$ and 42.18 g of 1,1,1,3,5,5,5-heptamethylhydrogen trisiloxane, $Me_3Si$—O-SiMeH—O—$SiMe_3$,are loaded into a 250 ml round-bottom flask provided with mechanical stirrer, condenser and nitrogen inlet, heated with an oil bath with temperature control in nitrogen atmosphere. The round-bottom flask is heated to 80° C. An $H_2PtCIs6(H_2O)$ solution in isopropanol is added to the mixture in an amount such to provide 10 ppm of Pt. The heat supply is interrupted and the exothermic hydrosilylation reaction is allowed to proceed until the temperature stops increasing.

The Si-H group is monitored until complete disappearance through FT-IR analysis. The group or product T-1 is cooled to 25° C. and filtered.

(T-1)

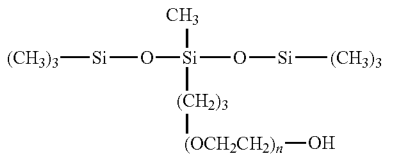

wherein n=10.

Synthesis Example 3 of the Compound (I.b)

99.94 g of ethyl acetate, 23.63 g of hexamethylene diisocyanate, product of oligomerization (isocyanurate) (mix of oligomers under the trade name Desmodur 3300 supplied by Covestro Deutschland AG corresponding to 0.1224 NCO equivalents, 57.12 g of the group or product (T-1) prepared in Example 2 having an average molecular weight of 700 amu corresponding to 0.0816 OH group equivalents are added into a 250 ml round-bottom flask provided with a mechanical stirrer and nitrogen inlet and heated with an oil bath with temperature control.

The resulting mixture is brought to 75-77° C. for 3 hours controlling the decrease in the intensity of peak of the NCO groups at 2261 $cm^{-1}$ through FT-IR analysis. After 3 hours of reaction, 9.53 g of di-hydroxypropyl terminated polydimethylsiloxane of general formula $HO(CH_2)_3Si(CH_3)_2O(SiO(CH_3)_2)_{n2}Si(CH_3)_2(CH_2)_3OH$, having an average equivalent weight of 236 amu were added, wherein n2=4.

The reaction is allowed to proceed until complete disappearance of the NCO groups, which is monitored through FT-IR analysis until the peak disappears at 2261 $cm^{-1}$.

Lastly, the solvent is removed from the reaction mixture through vacuum distillation. About 90 g of a viscous light-yellow compound, corresponding to 100% of active matter not dissolved in solvent, which is the compound (Lb), are obtained. Hereinafter, the compound will be referred to as "ANF-3A" or "ANF 3A", for the sake of brevity.

Synthesis Example 4 of the Compound (I.c)

99.95 g of ethyl acetate, 22.68 g of 1,3,5-tris(6-isocyanatehexyl)biuret (mix of oligomers under the trade name Desmodur 3200 supplied by Covestro Deutschland AG) corresponding to 0.124 NCO equivalents, 57.84 g of the intermediate T-1 prepared in Example 2 having an average molecular weight of 700 amu corresponding to 0.0826 OH group equivalents are placed in a 250 ml round-bottom flask provided with a mechanical stirrer and nitrogen inlet and heated with an oil bath with temperature control. The resulting mixture was subjected to a reaction at 75-77° C. for 3 hours controlling the decrease in the intensity of peak of the NCO groups at 2261 $cm^{-1}$ through FT-IR analysis.

After 3 hours of reaction, 17.56 g of di-hydroxypropyl terminated polydimethylsiloxane of general formula $HO(CH_2)_3Si(CH_3)_{20}(SiO(CH_3)_2)n_2Si(CH_3)_2(CH_2)_3OH$, having an average equivalent weight of 425 amu -equal to 0.0414 OH group equivalents—were added, wherein n2 is about 9. The reaction is allowed to proceed until complete disappearance of the NCO groups, monitored through FT-IR analysis until the peak disappears at 2261 $cm^{-1}$.

Lastly, the solvent is removed from the reaction mixture through vacuum distillation. About 98 g of a viscous light-yellow compound, corresponding to 100% of active matter not dissolved in solvent, which is the compound (I.c) are obtained. Hereinafter, the compound will be referred to as "ANF-1A" or "ANF 1A", for the sake of brevity.

Synthesis Example 5 of the Compound (I.d)

99.94 g of ethyl acetate, 22.13g of hexamethylene diisocyanate, product of oligomerization (isocyanurate) (mix of oligomers under the trade name Desmodur 3300 supplied by Covestro Deutschland AG) corresponding to 0.1146 NCO equivalents, 64.94 g of a mixture of poly(oxy-1,2-ethanediyl), a-(4,4,5,5,6,6,7,7,8,8,9,9,9-tridecafluoro-2-hydroxynonyl)-w-hydrosis with structural formula $C_6F_{13}CH_2CH(OH)CH_2O(CH_2CH_2O)_{10}CH_3$ having an average molecular weight of 848 amu corresponding to 0.0766 OH group equivalents are placed in a 250 ml round-bottom flask provided with mechanical stirrer, condenser and nitrogen inlet and heated with an oil bath and temperature control.

The resulting mixture was subjected to a reaction at 75-77° C. for 3 hours controlling the decrease in the intensity of peak of the NCO groups at 2261 $cm^{-1}$ through FT-IR analysis.

After 3 hours of reaction, 16.24 g of di-hydroxypropyl terminated polydimethylsiloxane of general formula $HO(CH_2)_3Si(CH_3)_{20}(SiO(CH_3)_2)n_2Si(CH_3)_2(CH_2)_{30}H$, having an average equivalent weight of 425 amu were added, with n2 equal to about 9.

The reaction is allowed to proceed until complete disappearance of the NCO groups, which is monitored through FT-IR analysis until the peak disappears at 2261 $cm^{-1}$.

Lastly, the solvent is removed from the reaction mixture through vacuum distillation. About 103 g of a viscous light yellow compound, corresponding to 100% of active matter not dissolved in solvent, which is the compound (I.d), are obtained. Hereinafter, the compound will be referred to as "ANF-2A" or "ANF 2A", for the sake of brevity.

Synthesis Example 6 of a Further Compound According to the General Formula (I)

100 g of butyl acetate, 14.65 g of isophorone diisocyanate (IPDI) trimmer under the trade name Vestanat T-1890 supplied by Evonik corresponding to 0.0603 NCO equivalents are placed in a 250 ml round-bottom flask provided with a mechanical stirrer and nitrogen inlet and heated with an oil bath with temperature control. After complete solubilisation of Vestanat T-1890, 28.12 g of intermediate T-1 prepared in example 2 having an average molecular weight of 700 amu corresponding to 0.0402 OH group equivalents are added.

The resulting mixture was subjected to a reaction at 75-77° C. for 3 hours controlling the decrease in the intensity of peak of the NCO groups at 2261 $cm^{-1}$ through FT-IR analysis.

After 3 hours of reaction, 56.29 g of di-hydroxyalkylcarbinol terminated polydimethylsiloxane—precursor of the compound of general formula (B.I)—of the following general formula were added

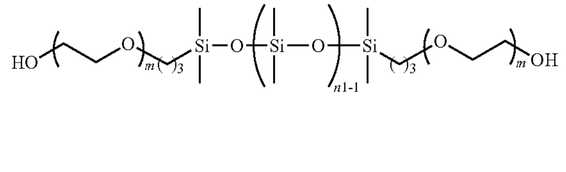

wherein n1=33 and wherein m=2, having an average equivalent weight of 2800 amu.

The reaction is allowed to proceed until complete disappearance of the NCOs, which is monitored through FT-IR analysis until the peak disappears at 2261 $cm^{-1}$.

About 200 g of a polymer dissolved at 50% by weight in butyl acetate are obtained. Hereinafter, this compound of general formula (L.e) will be referred to as "ANF-4A" or "ANF 4A" for the sake of brevity.

Compounds ANF-1A and ANF-2A were also tested in other tests, although the tests on these compounds are not documented in this experimental part given that they have efficacy in line with the test results relating to ANF-0A and ANF-3A.

A cross-linking agent polydimethylsiloxane (ES40) was added subsequently, keeping under stirring for 5 minutes; the activating agent (or catalyst) tetrabutylammonium fluoride (TBAF) was added subsequently, under stirring. The formulations prepared, as applied PVC panels as such are reported below:

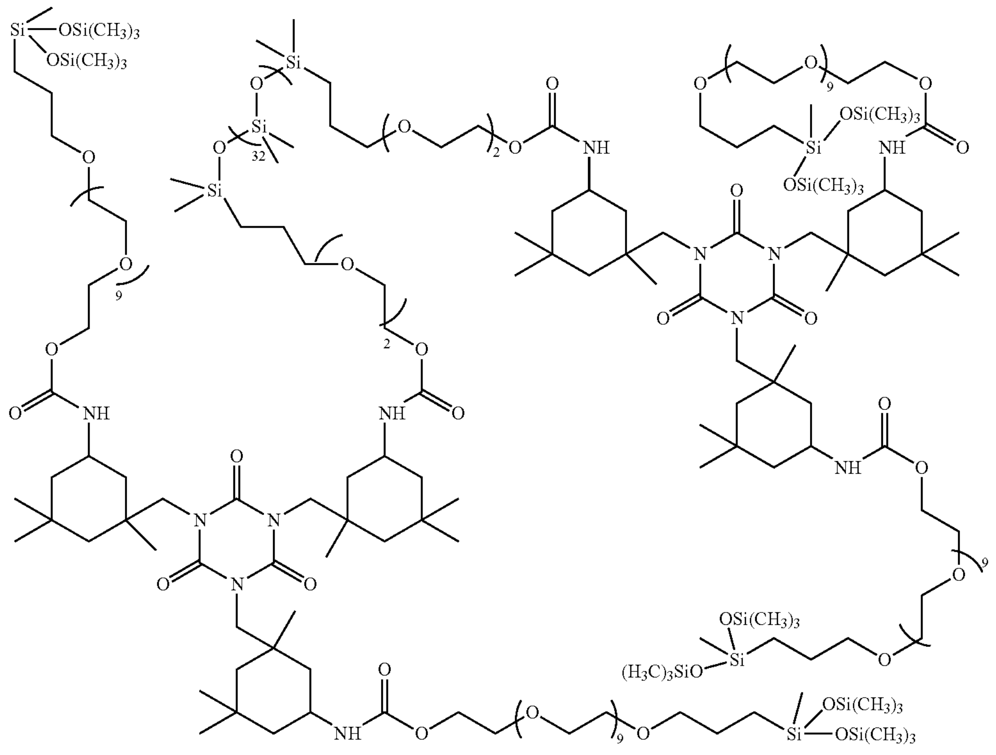

Anti-fouling and fouling release tests.

Example 7: Preparation of the Panels for Submersion Tests at Sea

Panels (measuring 20 cm×20 cm) made of both PVC as such and primed steel, that is treated with a two-component epoxy primer (Defender@marketed by Boero Bartolomeo S.p.A.), were used for tests at sea.

The panels were previously abraded and cleaned with denatured ethyl alcohol. The panels were coated by depositing 300 μm of a polydimethylsiloxane (PDMS)-based reactive liquid polymeric formulation thereon, by means of a bar coater (ELCOMETER 4360 spiral 250 mm, 300 m). After deposition, the sol-gel reaction of the matrix was allowed to proceed at room temperature and at a pressure of 1 atm for 3-5 hours. The polymeric films were then left to stand until complete evaporation of the solvent (at least 24 hours at room temperature).

The polymeric formulations to be deposited were prepared by adding in a glass container—in the following order—silica nanoparticles (NP) functionalized with polydimethylsiloxane chains (CAB-O-SIL TS 720), dihydroxy-terminated polydimethylsiloxane (HO-PDMS-OH), a compound selected from ANF-0A or ANF-3A and xylene (solvent); these components were mixed, until a homogeneous formulation was obtained.

ANF-0A 4%+0.1 NP: PDMS with 4% by weight (with respect to HO-PDMS-OH) of ANF-0A and 0.1% by weight (with respect to HO-PDMS-OH) of functionalized silica nanoparticles;

ANF-3A 4%+0.1 NP: PDMS with 4% by weight (with respect to HO-PDMS-OH) of ANF-0A and 0.1% by weight (with respect to HO-PDMS-OH) of functionalized silica nanoparticles;

ANF-3A 1%+0.1 NP: PDMS with 1% by weight (with respect to HO-PDMS-OH) of ANF-3A and 0.1% by weight (with respect to HO-PDMS-OH) of functionalized silica nanoparticles.

Example 8: Antifouling tests on the serpulid *Ficopomatus enigmaticus* and fouling/release tests on the diatoms *Navicula salinicola*

The biological tests were conducted on specimen-carrying slides (measuring 24 mm×76 mm) coated with the polymeric formulations listed above, in which, however, there were used ethyl acetate as solvent and TBAF 0.08% by weight (with respect to HO-PDMS-OH). The specimen-carrying slides were previously submerged in a piranha ($H_2SO_4$ conc/$H_2O_2$ 30% 7/3 v/v) solution, for one hour at 80° C. and then washed with deionised water.

Example 9: Fouling/Release Test on the Diatoms *Navicula Salinicola*

Fouling tests on films containing the compound of general formula (I).

The fouling test was carried out by means of a quantitative measurement of the cells of the diatoms *Navicula salinicola* that adhered to the microscope slide. After incubation, the cells were adhered to the films and the algal biomass was quantified by measuring the intensity of fluorescence emitted by chlorophyll at the wavelength of 435 nm under excitation and 682 nm under emission. Fluorescence intensity was preliminarily compared to the actual number of adhered cells counted under the optical microscope obtaining afluorescence/cell number calibration line. Fluorescence measurement was carried out using a microplate reader (Synergy-HTX Biotech). Fluorescence values were corrected for background values emitted from materials deposited on slides in the absence of algal cells. The films subjected to the test, in triplicate, were incubated with a suspension of $10^4$ cells/ml of *Navicula salinicola*, under controlled conditions (T: 22° C.; photoperiod: 14 h light-10 h dark; light intensity: 3000 lux), for 24 hours. After the incubation period, each slide was washed with sterile sea water to remove the non-adhered cells. The actual presence and distribution of diatoms on the surfaces was also verified by observing the slides under the optical microscope as shown in FIG. 1.

Release tests on films containing the compound of general formula (I) Subsequently, a release test on the adhered diatoms was carried out by using a turbulent flow channel, aimed to evaluate the fouling release properties of the polymeric coatings. The function of the channel is to generate a measurable shear force and, as a result, to measure the adhesion force of the organisms to the surfaces. The polymeric films previously evaluated for cell adhesion, they were subjected to the shear stress of 28 Pa (corresponding to a 150 L/m flow) for 5 minutes.

Figure 2:
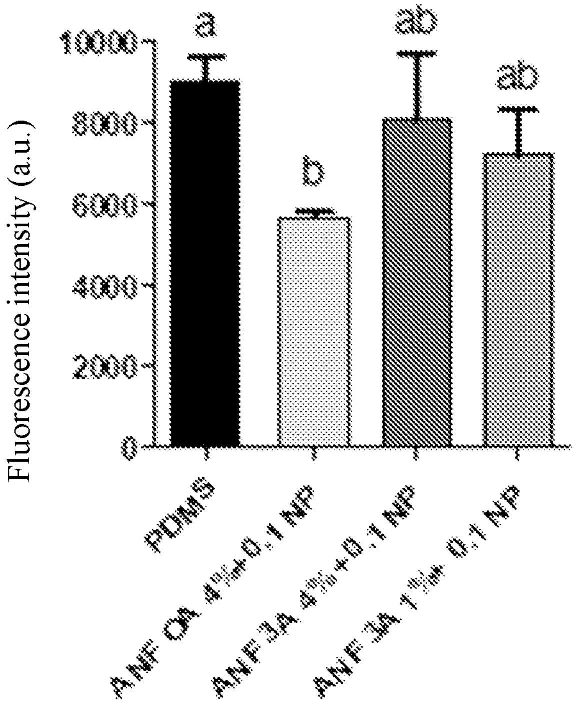
FIG. 2: Intensity of fluorescence emitted by the *Navicula salinicola* cells adhered to the different tested surfaces, after 24 hours of incubation. An analysis of the ONE-WAY ANOVA (n=3) analysis of variance was conducted followed by a post hoc Tukey's test. Different letters indicate statistically significant differences, probability value $p \leq 0.05$.

FIG. 2 shows the results of the release test—after 24 hours of incubation of the slides—as chlorophyll fluorescence intensity values measured on each surface.

The differences between the analysed surfaces were evaluated through the ONE-WAY ANOVA analysis of variance. The analysis showed statistically significant differences between the films of the reference matrix (PDMS) and the films containing the compounds of general formula (I). The compositions containing the compounds subject of the present invention showed a lower adhesion of the algal cells (antifouling function) with respect to PDMS.

Figure 3:
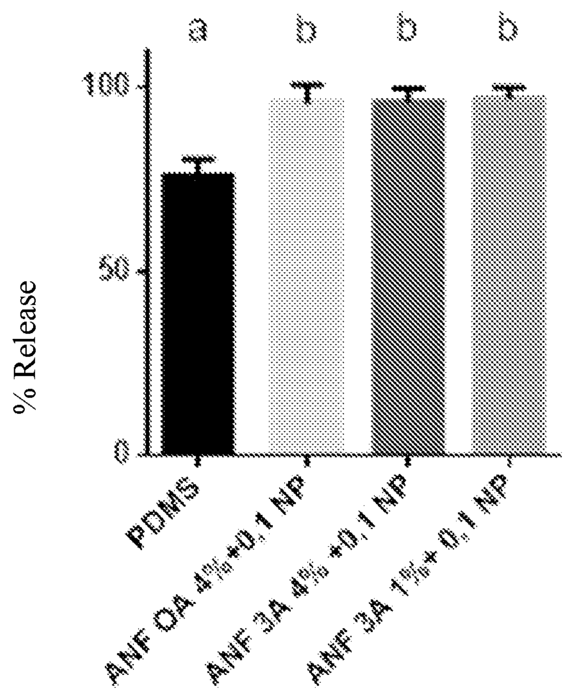
FIG. 3: Fouling release percentages of diatoms from the different tested surfaces after exposure to a shear stress equal to 28 Pa for 5 minutes. An ANOVA (n=3) analysis of variance was conducted followed by a post hoc Tukey's test (for multiple comparison). Different letters indicate statistically significant differences, $p \leq 0.05$.

FIG. 3 shows the results relating to the release test under flow of the diatoms adhered to the surfaces.

The same slides used for the previous fouling test were used for the test. Once subjected to flow, the adhered algal biomass was quantified again at the end of the test. All samples showed a significantly higher percentage of algal biomass release (>92%) with respect to the release percentage determined for the PDMS (76%) used as reference.

Example 10: Fouling Test on the Larvae of the Serpulid *Ficopomatus enigmaticus*

The antifouling behaviour of the various compounds of general formula (I) was evaluated by quantifying the number of larvae of *Ficopomatus enigmaticus* that adhered on each film over a defined period of time (24 hours, 48 hours and 5 days).

The stage of development of the larvae required to carry out the test is defined as the stage "of competence" and it is obtained about 10 days after fertilisation. Upon reaching the stage of competence, the fouling test was carried out on the various polymeric films.

One 1 ml drop of filtered sea water (FSW), in which 20 competent larvae were placed, was pipetted on each surface, placed in Quadriperm® plates (6 replicates per polymer). The plates were then incubated at 21° C.±2° C. in the dark. The percentage of adhered larvae was calculated after 24 hours, 48 hours and 5 days of incubation, by directly counting the number of adhered organisms.

Figure 4:
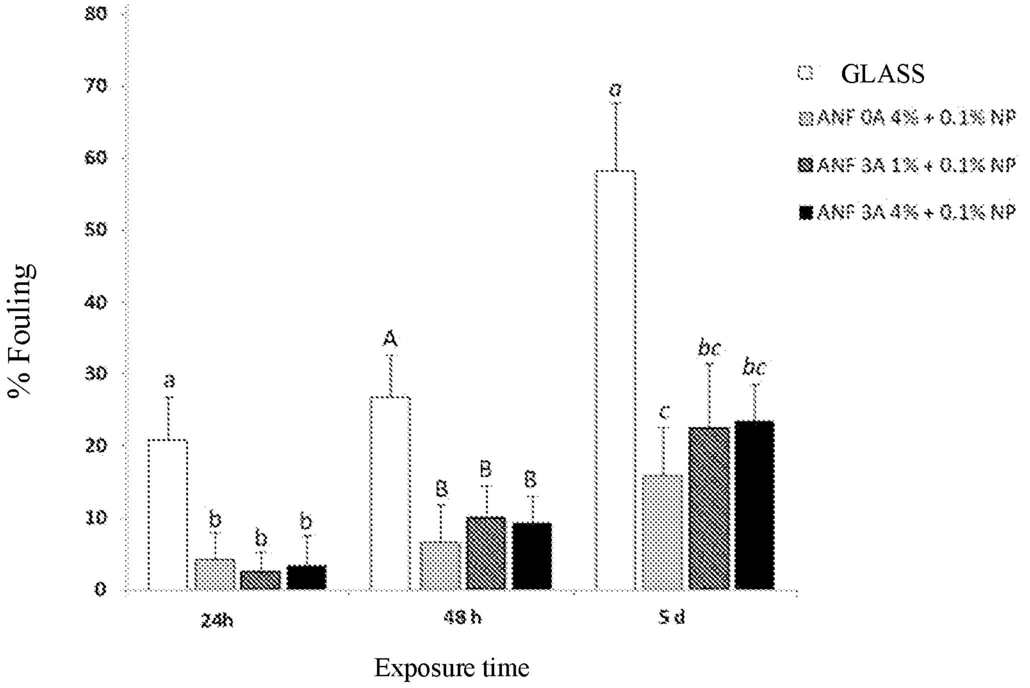
FIG. 4: Percentage of adhesion of competent larvae of *Ficopomatus enigmaticus* on various films at 24 hours, 48 hours and 5 days of exposure. The values are expressed as the mean percentage of adhered larvae. 20 competent larvae (about 10 days of age) were deposited on each film replicate, the percentages are calculated on this number. An ANOVA (n=6) analysis of variance was conducted followed by a post hoc Tukey's test (for multiple comparison). Different letters indicate statistically significant differences, $p \leq 0.05$.

FIG. 4 shows the various percentages of adhesion of competent larvae of *Ficopomatus enigmaticus* on the various surfaces at 24 hours, 48 hours and 5 days of exposure. The glass (positive control) showed a statistically higher percentage of adhesion with respect to all the polymeric surfaces tested. The polymeric films did not show, with respect to each other, statistically significant differences at the three times considered in this test. Similar results were obtained for all the other compositions, according to the present invention.

Release tests regarding the calcareous tubes of *Ficopomatus enigmaticus* could not be carried out given that the number of adhered larvae per sample was too low and therefore not sufficient to consider the release test statistically significant. These results show the antifouling ability of the films containing the compound of general formula (I) according to the present invention.

Example 11: Exposure of the Panels at Sea

Each protection coating was deposited in triplicate on PVC or steel panels primed with PDMS (Defender® marketed by Boero Bartolomeo S.p.A.), as reported above. Furthermore, 3 control panels, two made of steel as such and one made of PVC as such (that is treated neither with the primer nor with the protection coating comprising the compounds of general formula (I) subject of the present invention) were added; the latter were introduced in order to evaluate the ecological progression of fouling over the test period. The different replicates of each formulation were fixed to three different PVC mesh frames. These frames were subsequently submerged in the area of the port of Livorno, kept floating at about 50 cm below the water surface.

The panels were submerged in a delimited area, where access was allowed only to people bound by confidentiality agreements with the proprietor of the present invention. The submersion period lasted about 4 months. Photographic samplings were carried out at different time intervals from the time of submersion (~3 weeks, ~1 month, ~2 months, ~2.5 months and ~3 months) in order to quantify the colonisation of the various surfaces over time.

The images obtained at each sampling were processed using the ImageJ software package, and the different surface coverage percentages were calculated on a virtual square (measuring 10 cm×10 cm) positioned approximately at the centre of each panel. The results obtained from these observations are purely quantitative (percentage of covered surface), and not qualitative given that the type of organisms that make up the various coverages was not taken into account.

Following the last inspection, the various frames were removed and taken to the laboratory for the fouling release test. This test provides for the use of a pressurised water lance, provided with a fixed angle nozzle, with a 150 bar output pressure. The nozzle of the lance was positioned orthogonally at about 50 cm from the surface of the panel. 2 spray exposure times were selected: 20 seconds and 90 seconds. At the end of each individual treatment time, a new photographic sampling was carried out in order to evaluate the fouling release properties in terms of biomass release of each protection coating.

Figure 5:
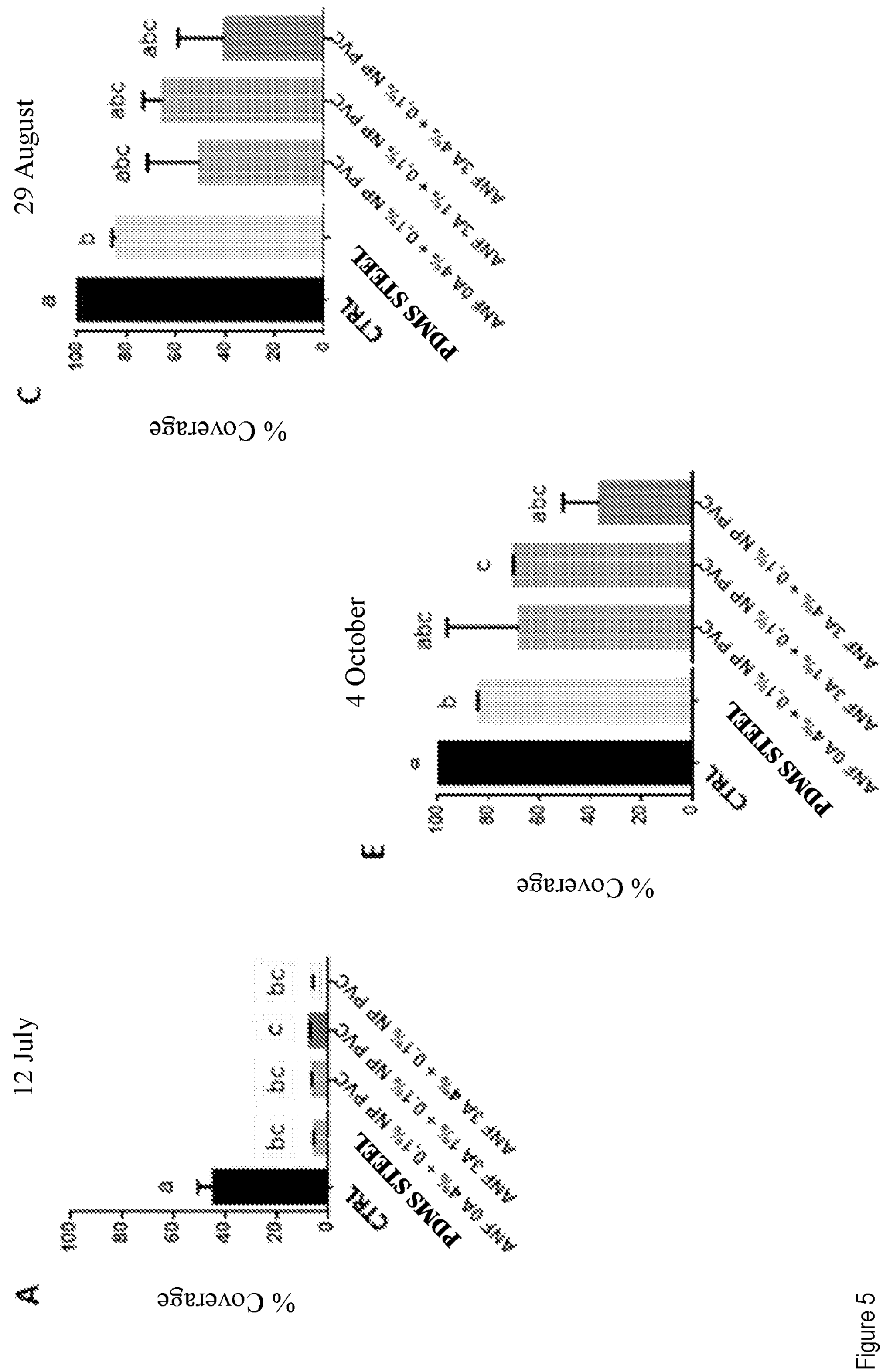
FIG. 5: Percentage coverage on different surfaces at different sampling times. A) 3 weeks of submersion; C) 2 months of submersion; E) 3 months of submersion, last sampling prior to removal. The differences were evaluated by means of the ANOVA (n=3) analysis of variance followed by a post-test (Tukey's test for multiple comparison); different letters indicate statistically significant differences.

The charts in FIG. 5 show the coverage percentages of all the panels in the various photographic samplings carried out. The differences between the behaviour of the surfaces were evaluated with an ANOVA analysis of variance, carried out for each detection. FIGS. 5A, 5C and 5E show markedly lower coverage percentages of the substrates comprising the compounds of general formula (I) with respect to the control panels. From the sequence of FIGS. 5A to 5E there can be deduced a higher colonisation rate of the control panels.

Figure 6:
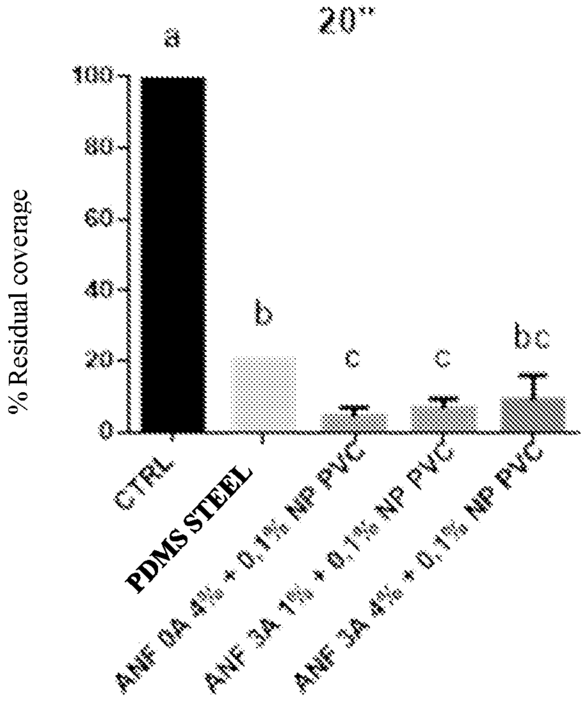
FIG. 6: Coverage percentages of residual fouling following application of 20" of pressurised flow (150 bar, 50 cm distance) at the end of the test. The differences were evaluated by means of the ONE- WAY ANOVA (n=3) analysis of variance followed by a post-test (Tukey's test); different letters indicate statistically significant differences, $p \leq 0.05$.
Figure 7:
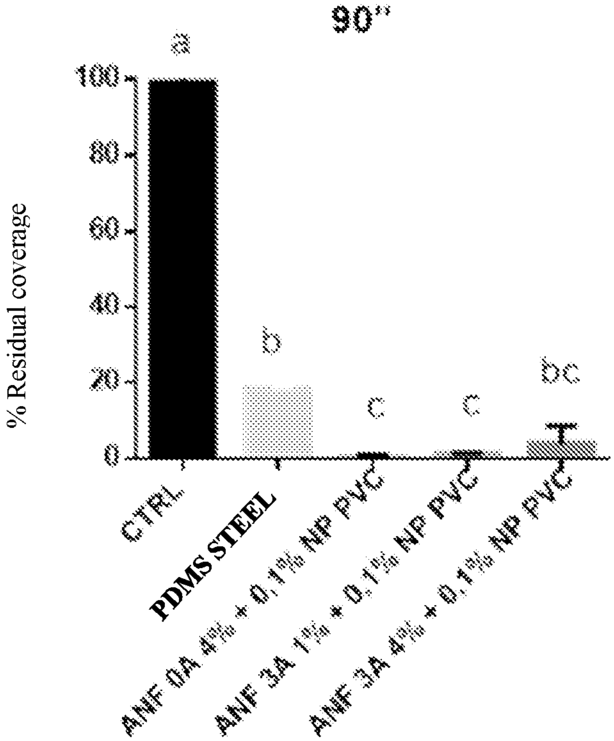
FIG. 7: Coverage percentages of residual fouling following application of 90" of pressurised flow (150 bar, 50 cm distance) at the end of the test. The differences were evaluated by means of the ONE-WAY ANOVA (n=3) analysis of variance followed by a post-test (Tukey's test); different letters indicate statistically significant differences, $p \leq 0.05$.
Figures 10A, 10B:
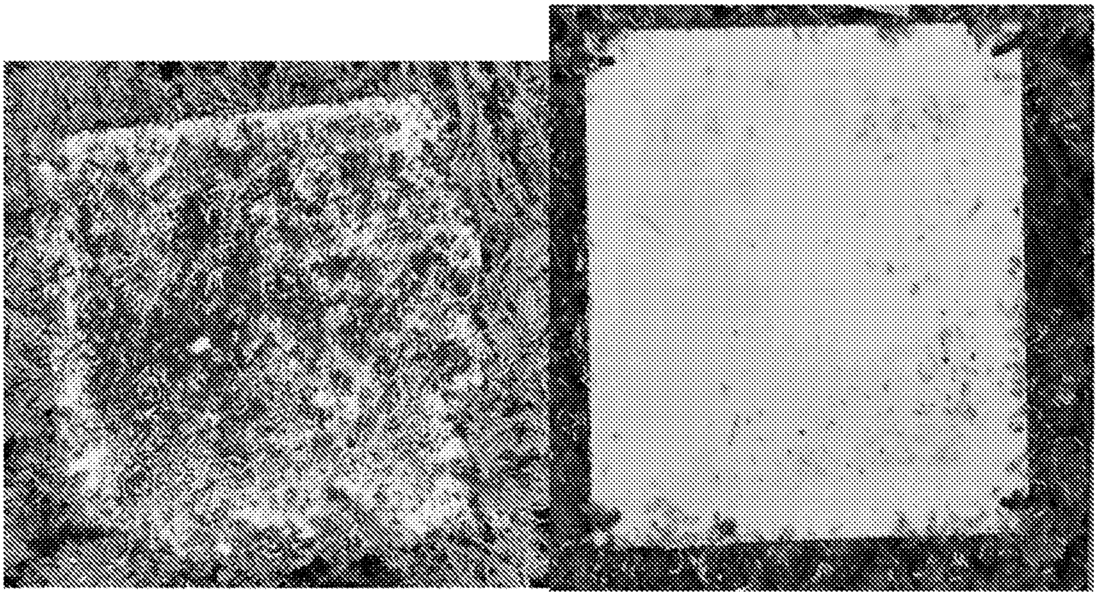
Figures 11A, 11B:
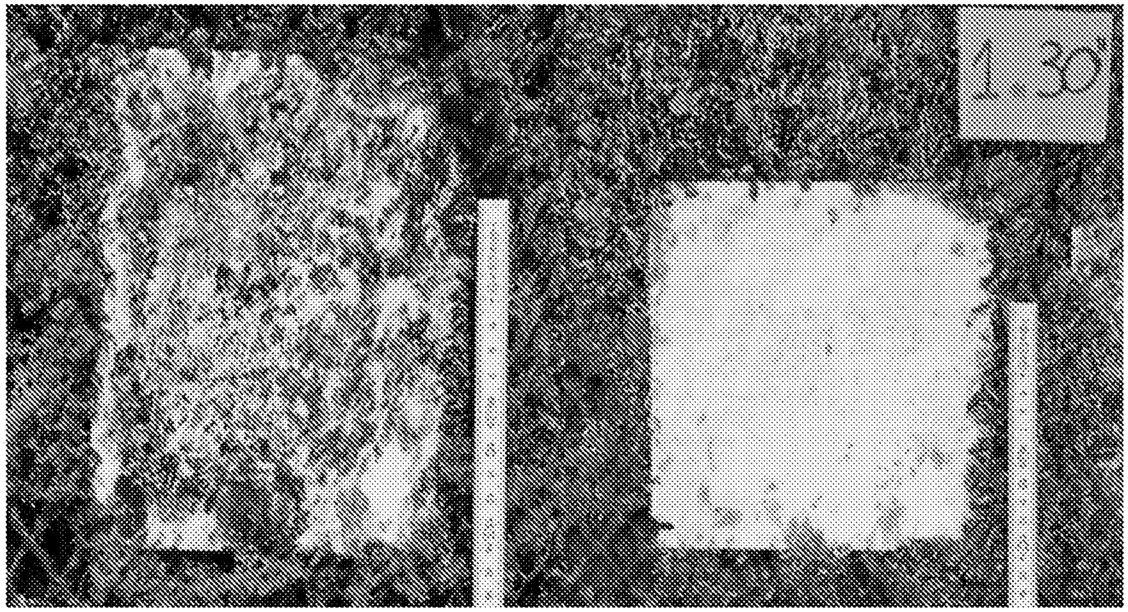

The charts in FIGS. 6 and 7 show the residual coverage percentages of the various surfaces following exposure for 20 seconds (FIG. 6) or 90 seconds (FIG. 7) to a pressurised water jet. As observable, even after the first 20 seconds of exposure the average residual coverage on each surface is significantly lower with respect to the last sampling carried out and significantly lower with respect to the controls. After 90 seconds of exposure, significant differences were observed also between the various specimens, with a significantly lower residual coverage on the polymers subject of the invention ANF-0A 4%+0.1% NP, ANF-3A 1%+0.1% NP and ANF-3A 4%+0.1% NP, with respect to PDMS.

The photographs shown in FIGS. 8A, 8B, 9A, 9B, 1OA, 1OB, 11A, 11B, 12A, 12B clearly show that the samples treated with the compounds subject of the present invention carry out an effective antifouling and fouling release function.

Example 12: Evaluation of Anti-Fouling Performance of Experimental Coatings Under Semi-Static Conditions Materials and Methods The experiment was based on the submersion of fibreglass specimens (measuring 20 cm×20 cm) under semi-static conditions in a protected marine environment (tourist port of Livorno). The coatings to be tested were prepared in three replicates, by previously treating the fibreglass specimens with a primer paint, in order to allow a correct deposition and polymerisation of the coatings subject of study. The formulations subject of the experiment are indicated as follows, wherein the indicated amounts are expressed as percentages by weight with respect to the total weight of said composition:

Blank (fibreglass);

PDMS;

ANF-OA (at 5% by weight and at 7.5% by weight);

ANF-1A (at 5% by weight and at 7.5% by weight);

ANF-3A (at 5% by weight and at 7.5% by weight).

A replicate for each coating was placed on a different frame in the mesh (or submersion frame). The three submersion frames, each containing a total of seven specimens plus an experimental blank, consisting of fibreglass alone, were submerged, keeping them suspended, at about 50 cm below the water surface, in the Marina Turistica "Yacht Club" in Livorno. The panels were submerged in a delimited area, where access was allowed only to people bound by confidentiality agreements with the proprietor of the present invention.

The submersion period lasted eight weeks. In order to quantify colonisation on the various surfaces over time, photographic samplings were carried out at fixed time intervals (2 weeks) from the time of submersion.

The images obtained at each sampling were processed using the ImageJ software package, to calculate the various surface coverage percentages. The results obtained from these observations are purely quantitative (covered surface percentage; "coverage %") and they exclusively consider the macro-fouling organisms.

In addition to the overall coverage, a qualitative evaluation relating to the type of organisms colonising the various surfaces was carried out in order to identify the main taxa they belong to.

Following the last inspection, the various frames were removed and taken to the laboratory for the release test. This test provides for the use of a pressurised water lance, provided with a fixed angle nozzle. The output pressure was maintained at 100 bar. The nozzle of the lance was positioned orthogonally at about 50 cm from the surface of the panel. Three spray exposure times were selected: 10, 20 and 90 seconds.

At the end of each individual treatment time, a new photographic sampling was carried out in order to evaluate the fouling release performance of each surface, in terms of biomass release.

Figure 13:
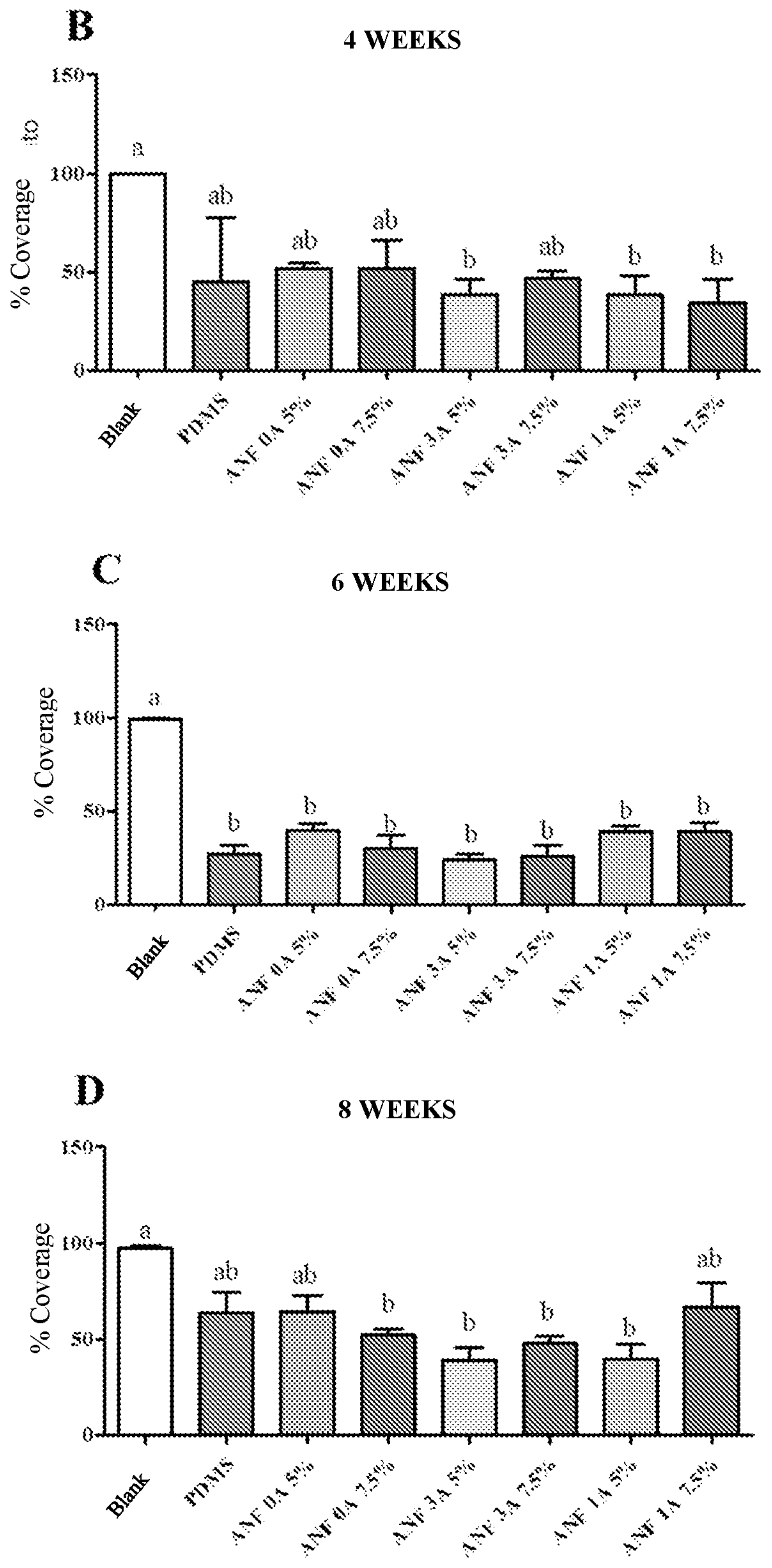
FIG. 13: Percentage coverage on different surfaces at different sampling times. A) 2 weeks of submersion; B) 4 weeks of submersion; C) 6 weeks of submersion; D) 8 weeks of submersion. The differences were evaluated by means of the ANOVA (n=3) analysis of variance followed by a post-test (Tukey's test for multiple comparison); different letters indicate statistically significant differences, $p<0.05$.
Figure 14:
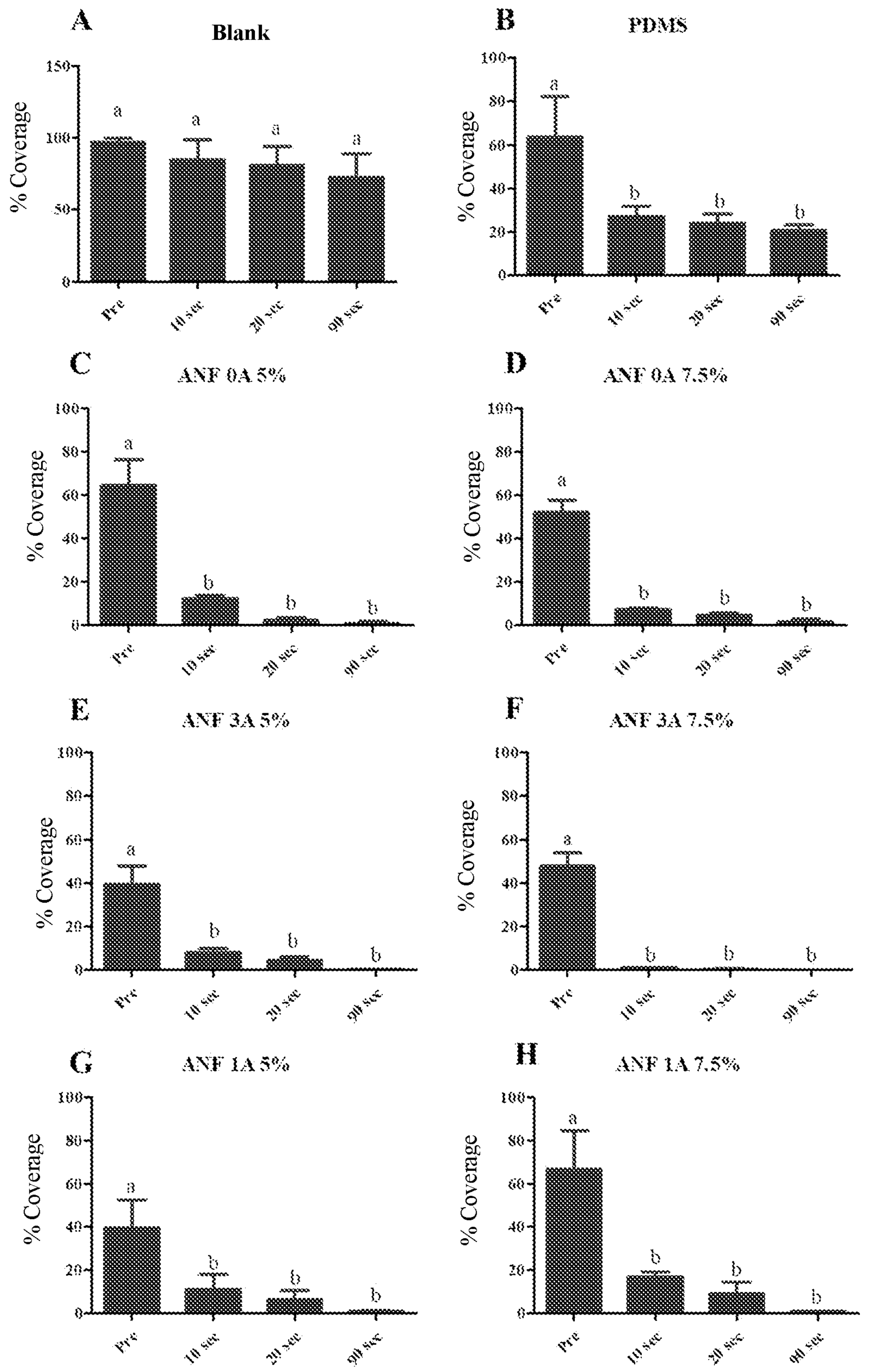
FIG. 14: Residual percentage coverage following exposure to different cleaning times (10-20-90 overall seconds) at a pressure of 100 bar. A) Blank (fibreglass); B) PDMS; C) ANF-0A 5%; D) ANF-0A 7.5%; E) ANF-3A 5%; F) ANF-3A 7.5%; G) ANF-1A 5%; H) ANF-1A 7.5%. The differences were evaluated by means of the ANOVA (n=3) analysis of variance followed by a post-test (Tukey's test for multiple comparison); different letters indicate statistically significant differences, $p<0.05$.

RESULTS AND DISCUSSION The charts in FIG. 13 show the coverage percentages measured on all panels exposed at sea, during the various photographic samplings carried out (from 2 to 8 weeks of submersion). The differences between the behaviour of the surfaces were evaluated with an ANOVA analysis of variance, carried out for each detection.

At 2 weeks of submersion (FIG. 13A) the average coverage percentage on the fibreglass specimens is significantly higher with respect to all other surfaces (−100%).

At 4 weeks from submersion (FIG. 13B) the coverage percentages on all coatings, except for ANF 1A 7.5%, are no longer statistically different from blank fibreglass, despite the increase in the surface coverage percentage not being sufficiently high to differentiate them from ANF 1A 7.5% too.

At 6 weeks of submersion (FIG. 13C) the statistical differences between the coverage percentages on the various surfaces are the same as that observed in chart 13A, showing a slight but generalised decrease in the coverage percentages, except for the blank fibreglass. This decrease, probably due to the excellent fouling-release performance of the tested coatings, was sufficient to restore a statistically significant difference of the various surfaces with respect to the blank, without identifying further differences between the experimental coatings.

At 8 weeks of submersion (FIG. 13D) a significant change in the coverage percentages between the various surfaces can be observed. In particular, although the blank remains the most colonised surface, the PDMS, ANF OA 5% and ANF 1A 7.5% coatings are not statistically different with respect to it, with an average percentage coverage higher than 50%. The ANF 3A (both at 5% by weight and at 7.5% by weight) and ANF 1A 5% coatings show the best performance and they are not statistically different.

As regards the qualitative evaluation of the main taxa colonising the algal felts, they are the most responsible for the colonisation of the surfaces.

In particular, there is no significant colonisation by hard macro-fouling organisms on any of the exposed surfaces for the evaluated period of time. Blank is an exception given that since the third inspection (6 weeks of submersion), it shows—on the surface—a presence of polychaete serpulidae (15-20% of the surface).

In general, the ecological succession of fouling organisms during the present experiment is at a rather early stage, characterised by the almost exclusive presence of algal felts and insignificant colonisation (<5%) both by microalgae with upright thallus and sessile animal organisms (such as bivalves, barnacle and polychaete), with the exception of sporadic presence (<5% of the surfaces on which it was detected) of soft-fouling macroorganisms belonging to the genus Botryllus (Ascidiacea).

The colonisation of the three blank replicates by a structured algal felt, followed by significant adhesion of polychaete serpulidae, indicate a significantly good and comparable anti-fouling performance of all tested surfaces.

Figure 15:
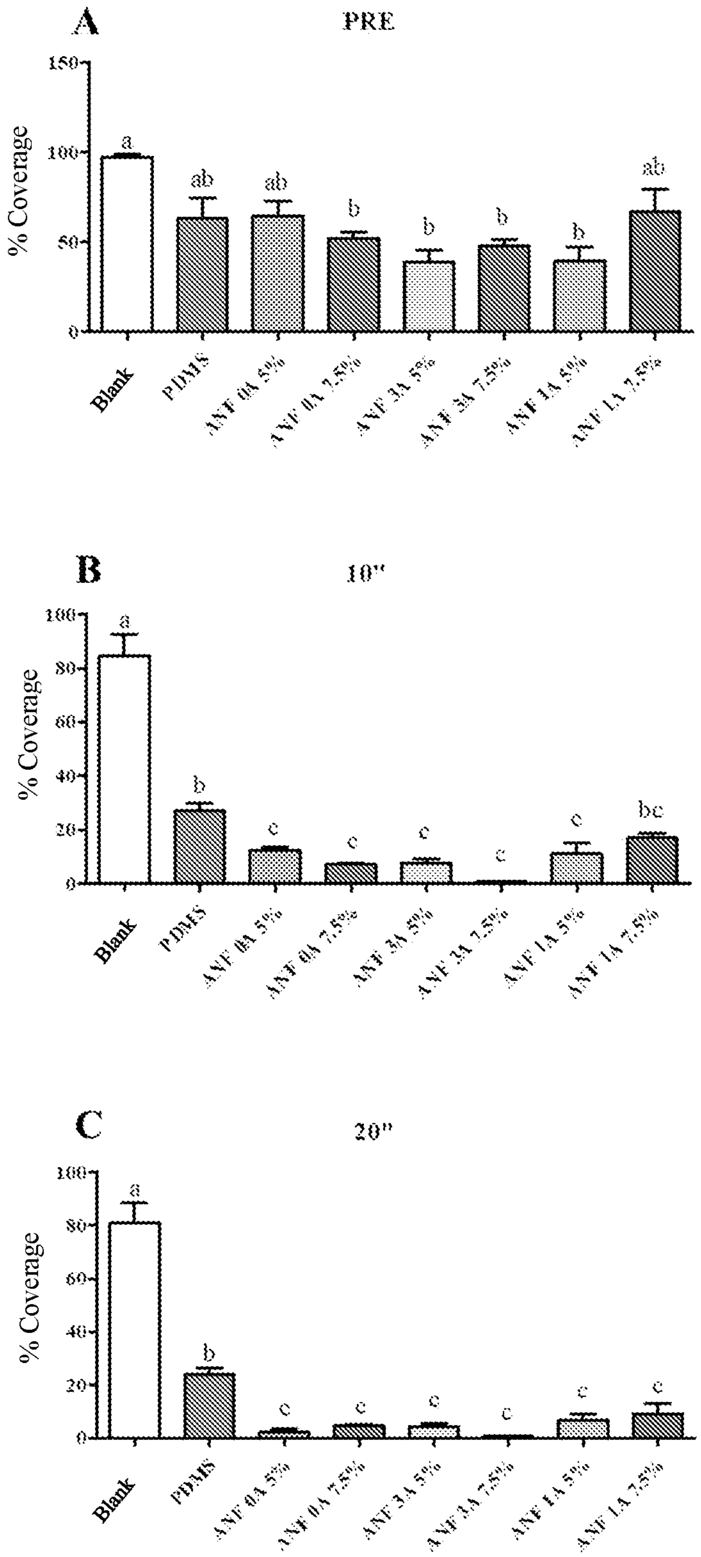
FIG. 15: Residual percentage coverage on the different sample surfaces following exposure to different cleaning times at a pressure of 100 bar: A) PRE-cleaning; B) 10 seconds; C) 20 seconds; D) 90 seconds. The differences were evaluated by means of the ANOVA (n=3) analysis of variance followed by 1 Tukey's post-test for multiple comparison (in the case of chart 3A) and by 2 Tukey's post-tests for consecutive multiple comparison (in the case of charts 3B-C-D). The 2 consecutive post-tests were conducted one maintaining the Blank results and the other excluding them. This need arose from the excessive incongruency between the percentage values of the Blank mean coverage and the one calculated for the other samples. Different letters indicate statistically significant differences, $p<0.05$.
Figure 15:
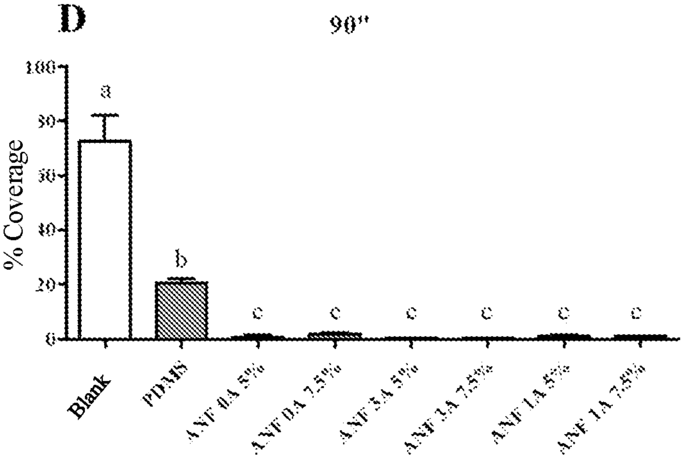
Figure 16:
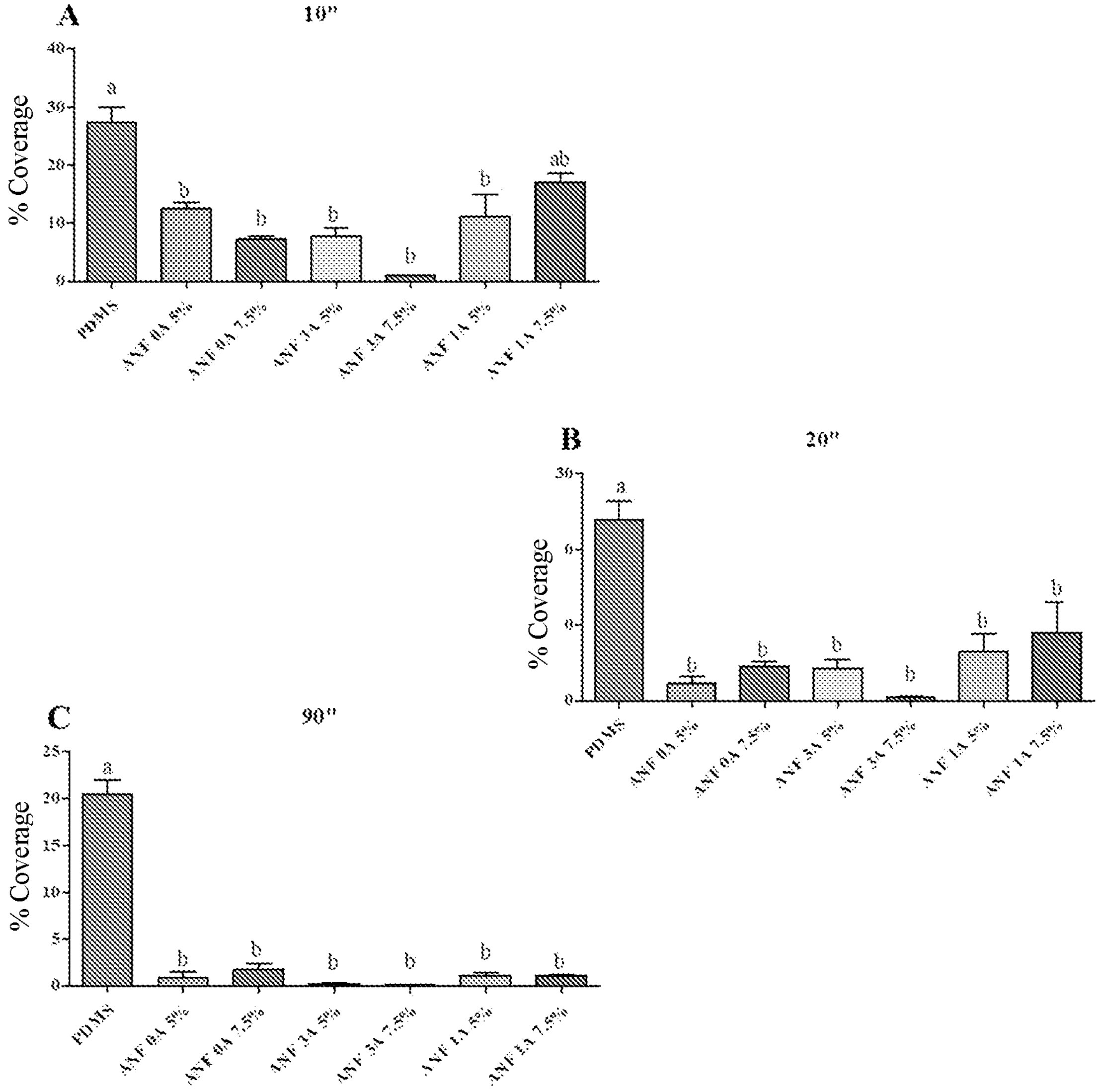
FIG. 16: Residual percentage coverage on the different sample surfaces following exposure to different cleaning times at a pressure of 100 bar: A) 10 seconds; C) 20 seconds; D) 90 seconds. Different letters indicate statistically significant differences, $p<0.05$. The figure is a re-adaptation of FIGS. 3A, 3B and 3C excluding the column with the Blank results for the sake of a better view.

FIG. 15 shows the results obtained of the release tests on the various surfaces with the replicates still intact at the tenth week of submersion. The percentage coverage differences before washing ("PRE") and following the three washings at different times (10 seconds, 20 seconds, 90 seconds overall), all carried out at an output water pressure of about 100 bar, were statistically evaluated for each coating. It can be observed that the blank shows a total absence of fouling-release effect following all washing times. As regards the other tested surfaces, the other tested samples showed a remarkable fouling-release ability right from the first 10 seconds of washing, with residual coverage percentages statistically different from the respective PRE condition and lower than 10%. The PDMS and the coating referred to as 1A 7.5%, which shows a statistically significant difference with respect to the PRE condition after 20 seconds of washing, are an exception. The coating with the best performance was found to be ANF 3A 7.5% given that it had the lower percentage of colonised surface with respect to the other coatings; furthermore, this percentage decreases to values lower than 1% after the first 10 seconds of washing.

The invention claimed is:

1. A compound of general formula (I):

(I)

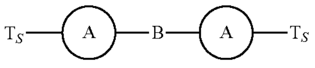

wherein:

B comprises a poly(dialkylsiloxane);

A represents a branched group having s branches, wherein s is an integer comprised from 2 to 7;

T represents a polyethylene glycol ether terminated with a fluoroalkyl group, a perfluoroalkyl group, a trialkylsiloxane group, or a polysiloxane group.

2. The compound of general formula (I) according to claim 1, wherein said poly(dialkylsiloxane) in said B comprises repeating units $(R'_2SiO)_n$, wherein n is a number comprised from 2 to 30, and wherein R' is methyl or ethyl.

3. The compound of general formula (I) according to claim 1, wherein B has general formula (B.I), (B.II), (B.III) or (B.IV):

wherein R is selected from:

(B.I)

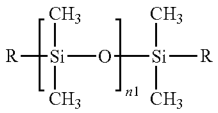

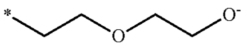

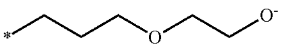 and

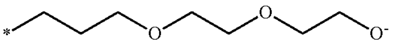

and wherein n1 is a number comprised from 2 to 30;

(B.II)

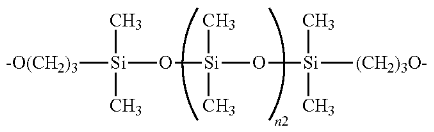

wherein n2 is a number comprised from 2 to 30;

(B.III)

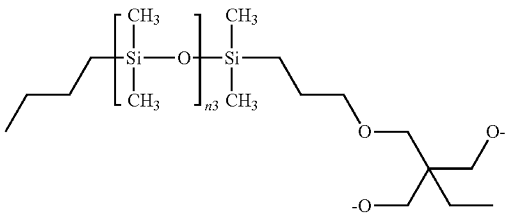

wherein n3 is an integer comprised from 3 to 15;

(B.IV)

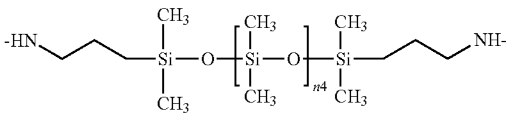

wherein n4 is an integer comprised from 3 to 15 where * connotes the attachment point of the groups R to a silicon atom.

4. The compound of general formula (I) according to claim 1, wherein A has general formula (A.I), (A.II) or (A.III):

(A.I)

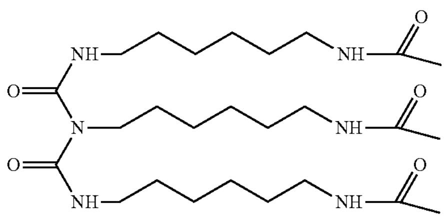

-continued (A.II)

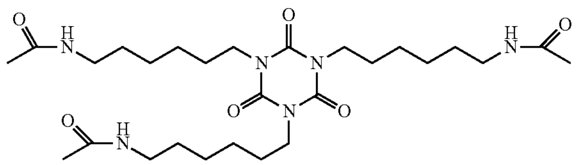

(A.III)

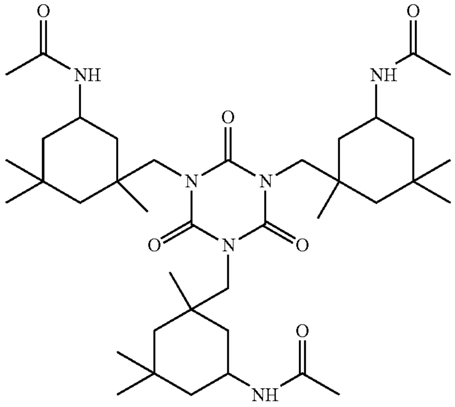

5. The compound of general formula (I) according to claim 1, wherein A has general formula (A.IV):

(A.IV)

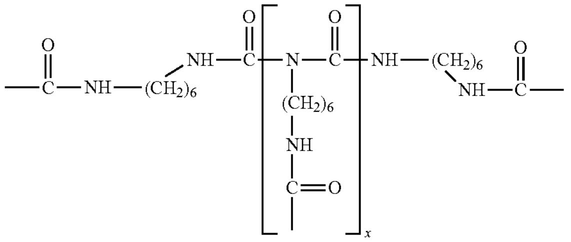

wherein x is a number comprised from 1 to 6.

6. The compound of general formula (I) according to claim 1 wherein T is selected from $((CH_3)_3SiO)_2Si(CH_3)—(CH_2)_3—O—(CH_2CH_2O)_b$ where b is 3 to 30; or

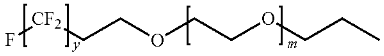

where y is 1 to 6 and m is 3 to 30.

7. The compound of claim 1, wherein said compound is selected from the following (I.a), (I.b), (I.c), (I.d), or (I.e):

(I.a)

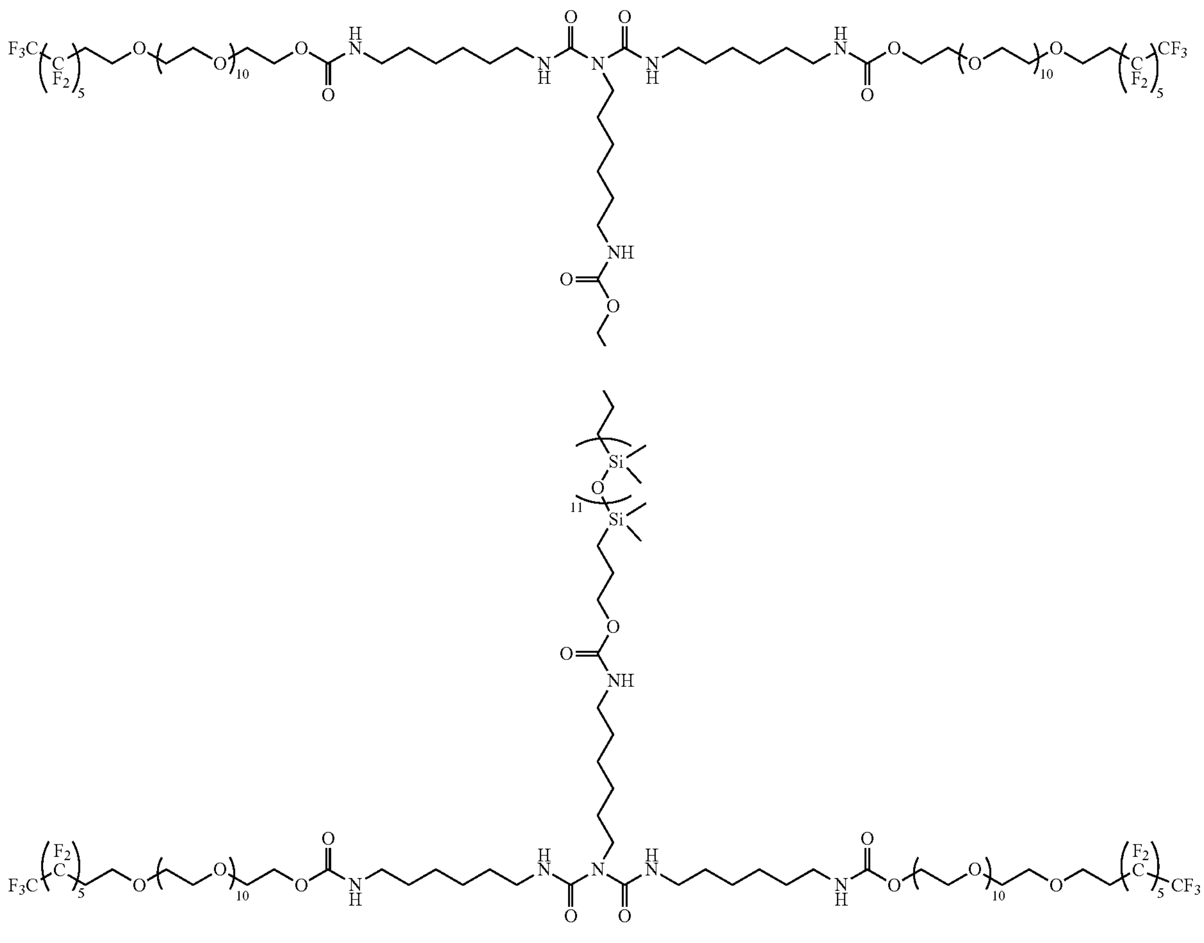

-continued
(I.b)
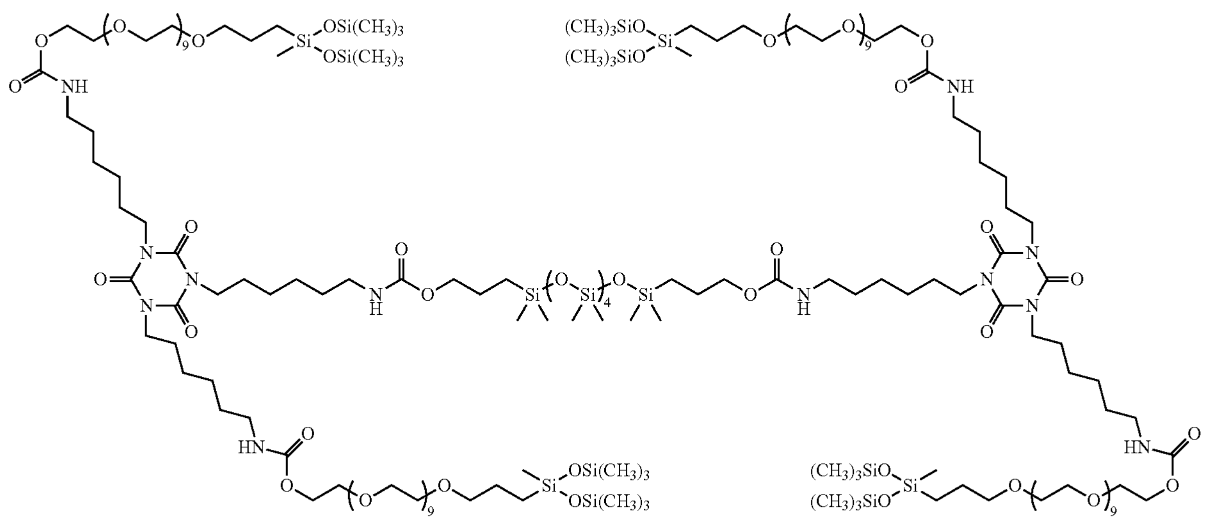
(I.c)
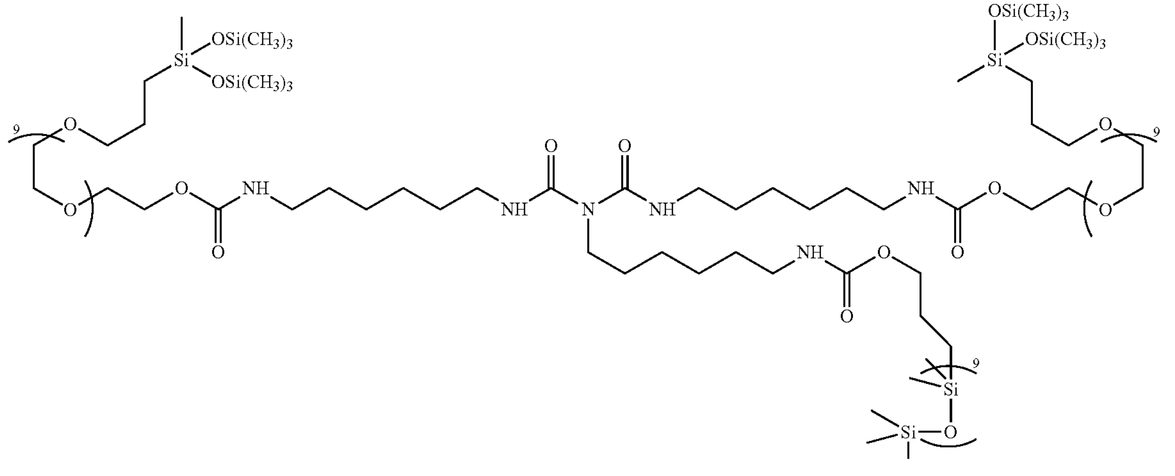
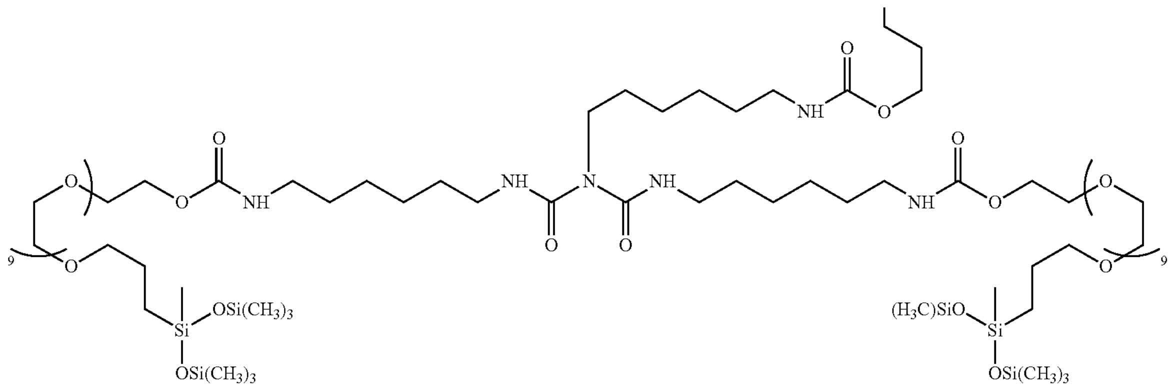

-continued
(I.d)
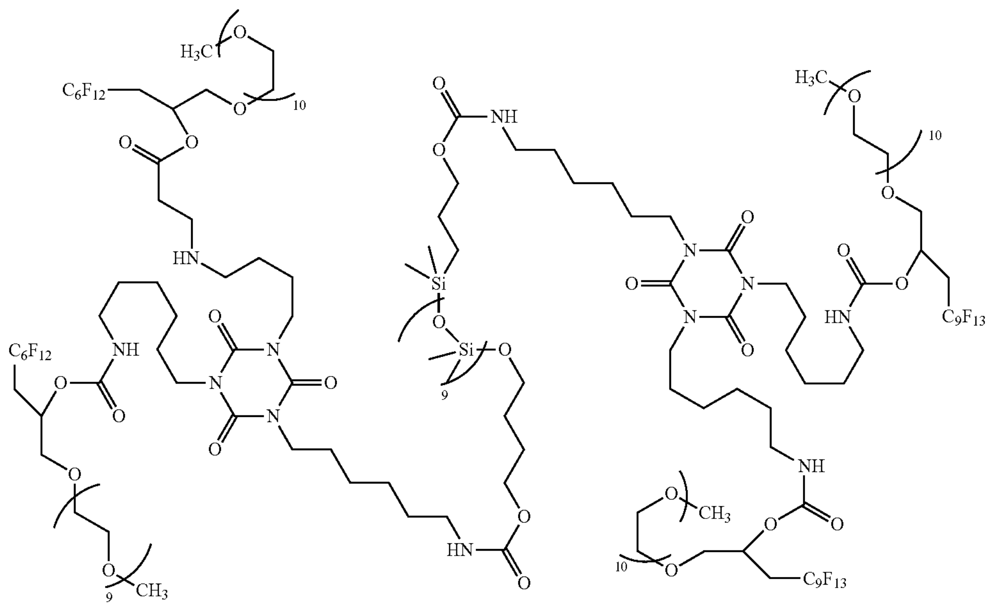
(I.e)
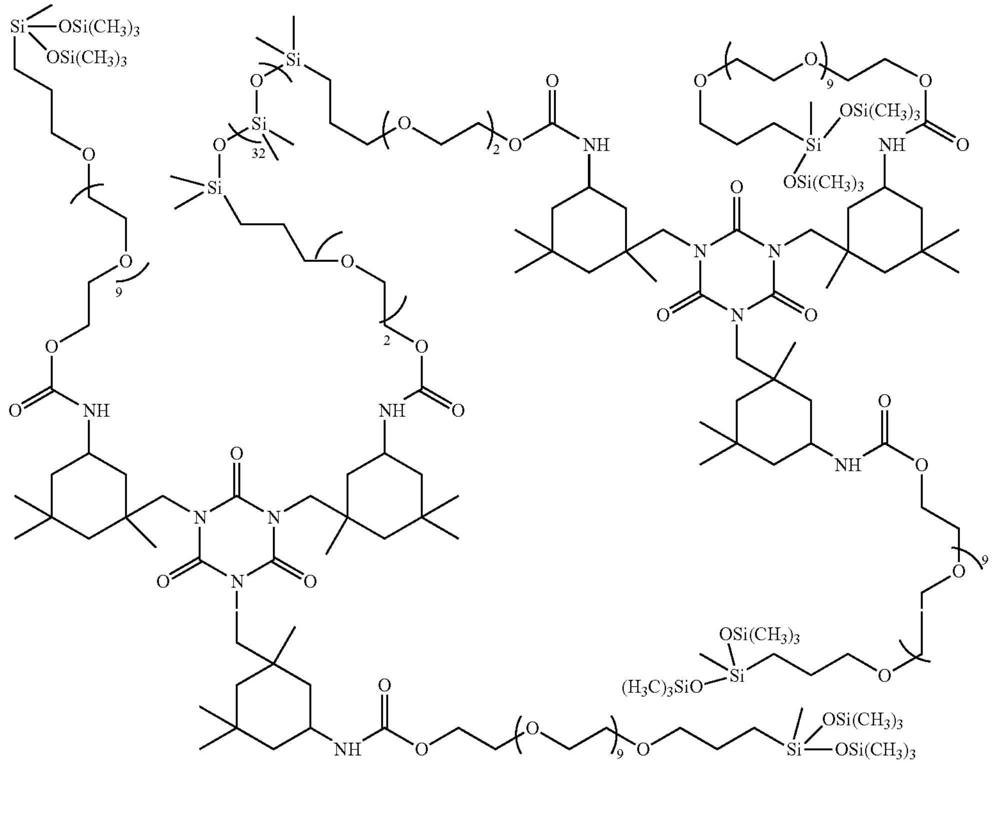
8. A method comprising using the compound of claim 1 as a biofouling reducing agent, as an antifouling agent and/or as a fouling release agent.
9. A composition comprising the compound of claim 1, and a cross-linkable polymer.
10. A substrate at least partially coated with the composition according to claim 9.
* * * * *